(12) United States Patent
Chan et al.

(10) Patent No.: US 12,233,495 B2
(45) Date of Patent: Feb. 25, 2025

(54) PRECISION ASSEMBLY PROCESS AND ADVANCE TOOLING METHODS OF USE

(71) Applicant: THE BOEING COMPANY, Arlington, VA (US)

(72) Inventors: Kwok Tung Chan, Seattle, WA (US); Farahnaz Sisco, Mukilteo, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/406,045

(22) Filed: Jan. 5, 2024

(65) Prior Publication Data

US 2024/0335915 A1 Oct. 10, 2024

Related U.S. Application Data

(60) Provisional application No. 63/494,507, filed on Apr. 6, 2023.

(51) Int. Cl.
*B23P 19/04* (2006.01)
*B23B 35/00* (2006.01)
*B23B 47/28* (2006.01)

(52) U.S. Cl.
CPC .............. *B23P 19/04* (2013.01); *B23B 35/00* (2013.01); *B23B 47/28* (2013.01)

(58) Field of Classification Search
CPC ....... B23B 47/28; B23B 35/00; B23B 47/287; B23B 2215/04; B23B 2247/08; B23P 19/04; B23P 2700/01; B64F 5/10
See application file for complete search history.

(56) References Cited

U.S. PATENT DOCUMENTS

| | | | |
|---|---|---|---|
| 4,108,566 A | 8/1978 | Jones | |
| 4,850,763 A * | 7/1989 | Jack | B23Q 9/0014 408/91 |
| 6,843,328 B2 * | 1/2005 | Boyl-Davis | B23Q 9/0007 173/32 |

(Continued)

FOREIGN PATENT DOCUMENTS

| | | |
|---|---|---|
| EP | 1683721 A1 | 7/2006 |
| GB | 2590670 A | 7/2021 |
| JP | 2015020232 A | 2/2015 |

OTHER PUBLICATIONS

European Patent Office, Partial European Search Report, App. No. 24162419.6 (Oct. 10, 2024).

*Primary Examiner* — Bayan Salone
(74) *Attorney, Agent, or Firm* — Walters & Wasylyna LLC

(57) ABSTRACT

Aspects of the present disclosure relate generally to the manufacture of assemblies of components, and in particular to methods, apparatus, and systems for performing manufacturing operations. In one aspect, a method of manufacturing an assembly of components includes positioning first and second components into a nominal configuration with respect to each other at a first factory location. The method further includes drilling a fastener joining hole through an interface of the first and second components at the first factory location. The method further includes positioning the first and second components for fastener joining at a second factory location. The method further includes inserting a fastener into the fastener joining hole to couple the first and second components together.

15 Claims, 17 Drawing Sheets

(56) References Cited

U.S. PATENT DOCUMENTS

| | | | |
|---|---|---|---|
| 6,855,099 B2* | 2/2005 | Hazlehurst | B21C 51/005 |
| | | | 33/286 |
| 10,773,830 B2* | 9/2020 | Chan | B64F 5/10 |
| 2005/0153818 A1* | 7/2005 | Hazlehurst | B21C 51/005 |
| | | | 483/1 |
| 2006/0176156 A1* | 8/2006 | Hazlehurst | B64F 5/10 |
| | | | 340/286.01 |

* cited by examiner

PRECISION ASSEMBLY PROCESS AND ADVANCE TOOLING METHODS OF USE

CROSS-REFERENCE TO RELATED APPLICATIONS

This application claims benefit of U.S. Provisional patent application Ser. No. 63/494,507, filed Apr. 6, 2023, which is incorporated herein by reference in its entirety.

FIELD

Aspects of the present disclosure relate generally to the manufacture of assemblies of components, and in particular to methods, apparatus, and systems for performing manufacturing operations.

BACKGROUND

Manufacturing an aircraft can involve assembling large numbers of components to form the aircraft. For example, an aircraft in the form of a commercial jetliner may have millions of parts that are manufactured and assembled to form the jetliner.

Assembling parts into structures that include assemblies and subassemblies may be performed using fastener systems. Factory-level automation for aircraft assembly includes the automated drilling of holes and insertion of fasteners. For example, the joining of different components of a wing for an aircraft may be automated utilizing equipment such as robotic arms.

Components that are joined to form assemblies or subassemblies may be made of different materials and at different locations by different manufacturers. For example, the material of some components of an assembly may be a composite, such as a carbon laminate composite, whereas the material of other components of the assembly may be a metal, such as an aluminum alloy. The components may be predrilled for fasteners at a component supplier's location prior to shipment to a different location at which assembly to other components takes place. Where components that are to be joined together are predrilled at different locations, it can be challenging to align the corresponding holes of the components within a designated tolerance upon assembly. The cumulative effect of manufacturing tolerances may exacerbate the fitment problem when an assembly requires the use of interference fit fasteners, and when assembling large components, such as for a wing that may include items that are about 50 to 100 feet (approximately 15 to 30 m) or more long.

In some cases, issues of fitment may be addressed by using robotic systems that drill the holes for fasteners and apply the fasteners at the time the components are brought together for assembly. Exemplary robotic systems perform several functions, such as alignment of the components to be drilled, drilling holes in the aligned components, cleaning up drilling debris, deburring the holes as needed, touchup painting as needed, fay surface sealing, realigning the components, and installing fasteners. Such robotic systems are large, complex, heavy, and expensive, typically requiring extensive space in which to operate, and necessitating the use of reinforced flooring.

The assembly of components, for example, of a wing structure of an aircraft involves aspects such as the prior application of a fay seal between adjoining components, and the pre-treatment of metal components (e.g. with a non-electrically conductive primer or by anodizing). However, the drilling of holes in the components at the time of assembly results in the exposure of bare metal (and/or composite material), and debris from drilling can cause contamination of a fay seal.

There is a need for systems and methods to facilitate the assembly of components while mitigating the above problems.

SUMMARY

Aspects of the present disclosure relate generally to the manufacture of assemblies of components, and in particular to methods, apparatus, and systems for performing manufacturing operations. In one aspect, a method of manufacturing an assembly of components includes positioning first and second components on a first jig at a first factory location. The method further includes drilling a hole through the first and second components on the first jig. The method further includes removing the first and second components from the first jig. The method further includes positioning the first and second components on a second jig at a second factory location. The method further includes inserting a fastener into the hole to couple the first and second components together on the second jig.

In another aspect, a method of manufacturing an assembly of components includes placing a first component onto a front surface of a jig. The front surface is opposite a back surface of the jig. The method further includes aligning a drill with an aperture in the jig at the back surface. The drill is coupled to a track of the jig that runs along at least a portion of a length of the jig. The method further includes moving a drill bit of the drill through the aperture to create a hole through the first component.

In another aspect, a method of manufacturing an assembly of components includes positioning first and second components into a nominal configuration with respect to each other at a first factory location. The method further includes drilling a fastener joining hole through an interface of the first and second components at the first factory location. The method further includes positioning the first and second components for fastener joining at a second factory location.

In another aspect, a jig for use in performing an operation on a component includes a body. The body includes a back surface and a front surface opposite the back surface. The front surface defines a nominal shape of the component. The jig further includes a track extending at least partially along a length of the body. A carriage is mounted to the track and adjacent the back surface. The carriage is configured for movement in an X direction along the track and in a Y direction perpendicular to the X direction. A drill is mounted to the carriage.

In another aspect, a system includes a jig. The jig includes a body. The body includes a back surface and a front surface opposite the back surface. The front surface defines a nominal shape of the component. The jig further includes a track extending at least partially along a length of the body. The jig further includes a carriage mounted to the track and adjacent the back surface. The carriage is configured for movement in an X direction along the track and in a Y direction perpendicular to the X direction. The jig further includes a drill mounted to the carriage. The system further includes first and second supports coupled to the jig, and a motor configured to rotate the jig between the first and second supports about an axis parallel to the length of the body.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

To facilitate understanding, identical reference numerals have been used, where possible, to designate identical elements that are common to the figures. It is contemplated that elements and features of any one aspect may be beneficially incorporated in other aspects without further recitation.

DETAILED DESCRIPTION

Aspects of the present disclosure relate generally to the manufacture of assemblies of components, and in particular to methods, apparatus, and systems for performing manufacturing operations. Although presented in the context of aircraft manufacture, it is contemplated that the methods, apparatus, and systems disclosed herein are generally suitable for use in other industries.

Figures 1A, 1B:
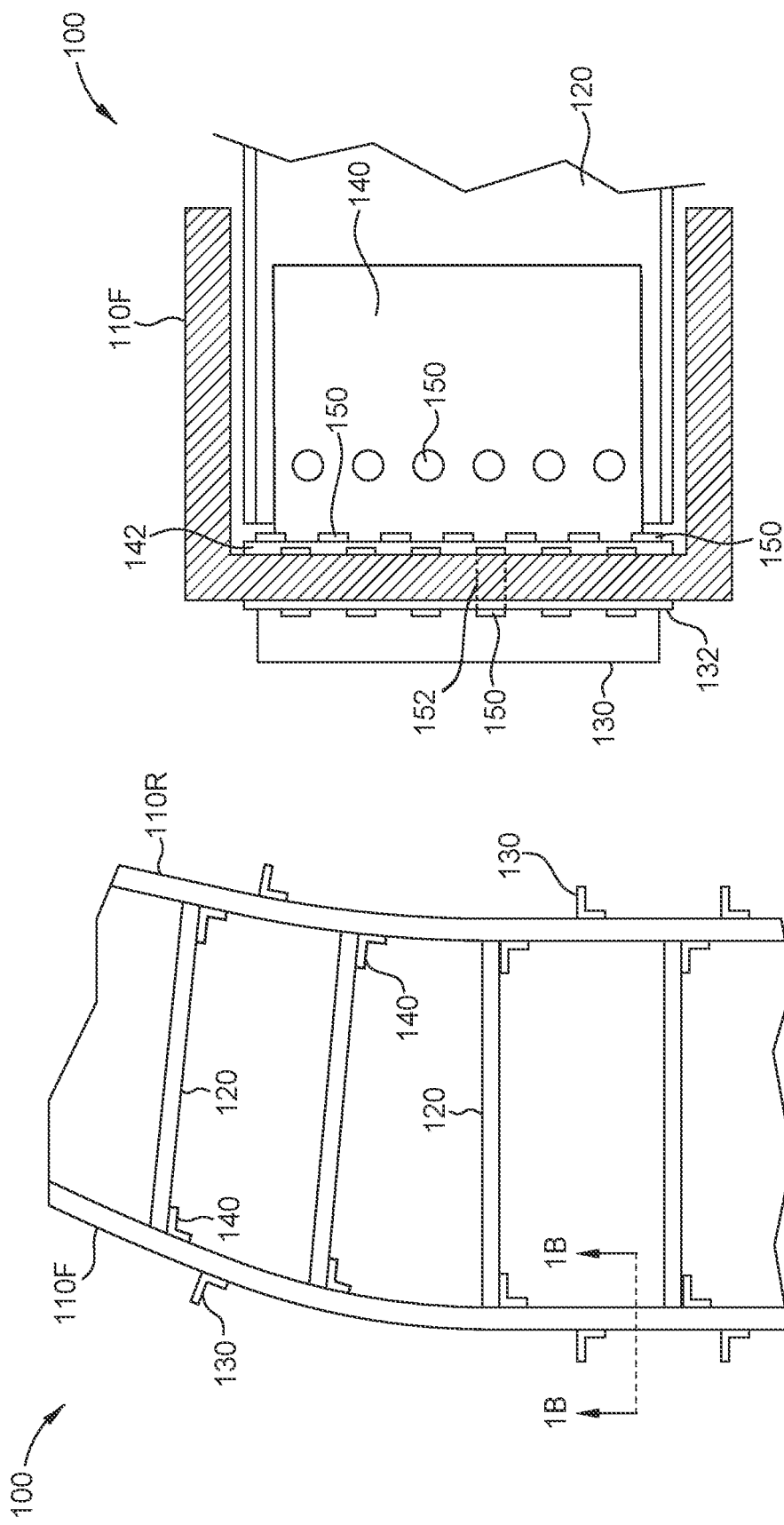
FIGS. 1A and 1B schematically illustrate an exemplary assembly of components.

FIGS. 1A and 1B schematically illustrate an exemplary assembly 100 of components that forms a portion of a wing of an aircraft. The assembling of the components is facilitated by the methods, apparatus, and systems of the present disclosure. FIG. 1A is a top view showing a front spar 110F coupled to a rear spar 110R by several ribs 120. The front spar 110F, rear spar 110R, and ribs 120 may be made of a metal (such as an aluminum alloy), a composite material (such as a carbon laminate composite), or any other suitable material. In some aspects, the front spar 110F and the rear spar 110R are made of one type of material (e.g. a composite), whereas the ribs 120 are made of a different type of material (e.g. a metal). As illustrated, in some aspects, at least one of the front spar 110F or the rear spar 110R may be contoured, or curved.

Also illustrated, in some aspects, one or more stiffeners 130 may be attached to at least one of the front spar 110F or the rear spar 110R. The stiffeners 130 are shown as being in an L-shaped configuration, although other suitable shapes are contemplated also. The stiffeners 130 may be made of a metal (such as an aluminum alloy), a composite material (such as a carbon laminate composite), or any other suitable material. In some aspects the stiffeners 130 are made of a type of material (e.g. a metal) that is different from the material of the front spar 110F or the rear spar 110R.

FIG. 1B is a cross-sectional view through a portion of the assembly 100. The front spar 110F is configured as a U-shaped channel. A rib 120 is coupled to the front spar 110F by a rib post 140. The rib 120 is coupled to the rib post 140 by fasteners 150, such as bolts, rivets, or the like. In some aspects, the fasteners 150 are interference fit fasteners. The rib post 140 is attached to the front spar 110F via a flange 142. The rib post 140 may be made of a metal (such as an aluminum alloy), a composite material (such as a carbon laminate composite), or any other suitable material. In some aspects the rib post 140 is made of a type of material (e.g. a metal) that is different from the material of the front spar 110F. A stiffener 130 is attached to the front spar 110F via a flange 132. The stiffener 130 may be made of a metal (such as an aluminum alloy), a composite material (such as a carbon laminate composite), or any other suitable material. In some aspects the stiffener 130 is made of a type of material (e.g. a metal) that is different from the material of the front spar 110F.

Attachment of components, such as the rib post 140 and the stiffener 130, to other components, such as the front spar 110F, is by additional fasteners 150 that pass through holes 152 drilled in each corresponding component. Each hole 152 is drilled to a size corresponding to a size of the fastener 150. In an example, the fastener 150 is sized for an interference fit in each hole 152. In order to create the holes 152 and promote accurate alignment of corresponding holes 152, the components are placed against each other such that corresponding components are at a desired juxtaposition, and then the holes 152 are drilled through the corresponding components. As discussed further below, in some aspects, the drilling is performed upstream of the final assembly location where fasteners 150 are installed. In an example, the drilling is performed at a supplier location, and then the components are shipped to an assembly location to be joined via fasteners 150 and with any sealant needed.

Figure 1C:
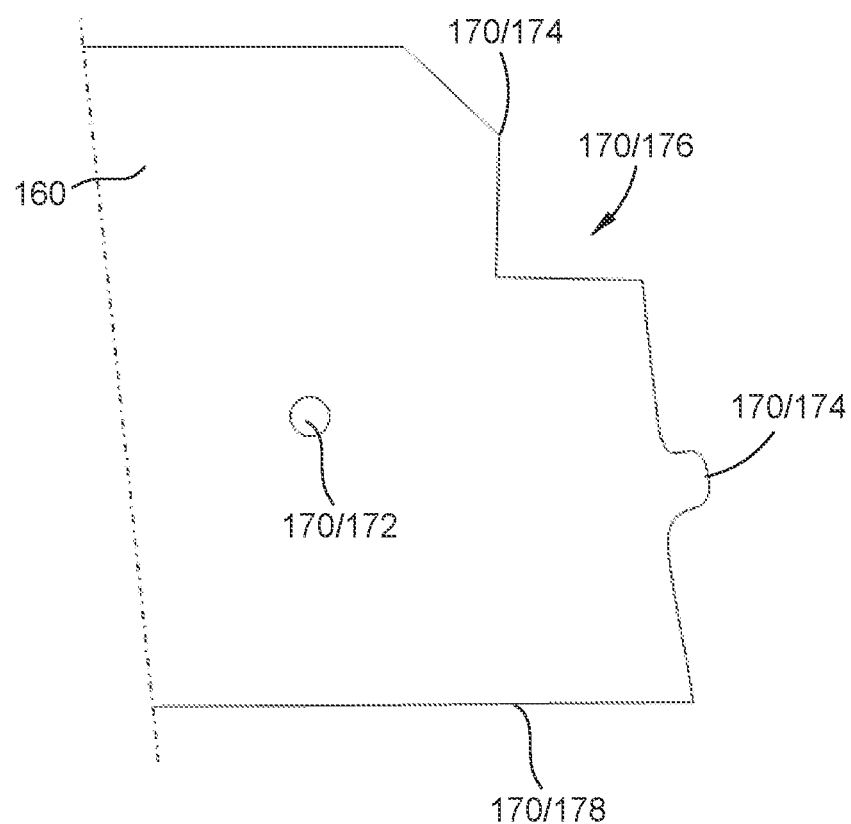
FIG. 1C schematically illustrates a top view of a portion of a component that is to be assembled to one or more other components.

FIG. 1C schematically illustrates a top view of a portion of a component 160 that is to be assembled to one or more other components. The component 160 may represent any of the front spar 110F, the rear spar 110R, the rib 120, the stiffener 130, or the rib post 140. The component 160 may represent any other item that is to be assembled to one or more further components. The component 160 includes one or more indexing features 170. In some aspects, the one or more indexing features 170 facilitate the positioning of the component 160 against a fixture (such as the jig 210, described below) by aligning the one or more indexing features 170 to a position adjacent one or more corresponding features (e.g. 240, 340 described below) of the fixture. In some aspects, the one or more indexing features 170 facilitate the alignment of the component 160 against another item (such as the front spar 110F, the rear spar 110R, the rib 120, the stiffener 130, the rib post 140, or any other item). In an example, the one or more indexing features 170 of component 160 are juxtaposed with one or more corresponding indexing features of the other item to align the component 160 with the other item. Exemplary indexing features 170 include an indexing hole 172, a protrusion 174, a shaped recess 176, and an edge 178 of the component 160.

Figure 1D:
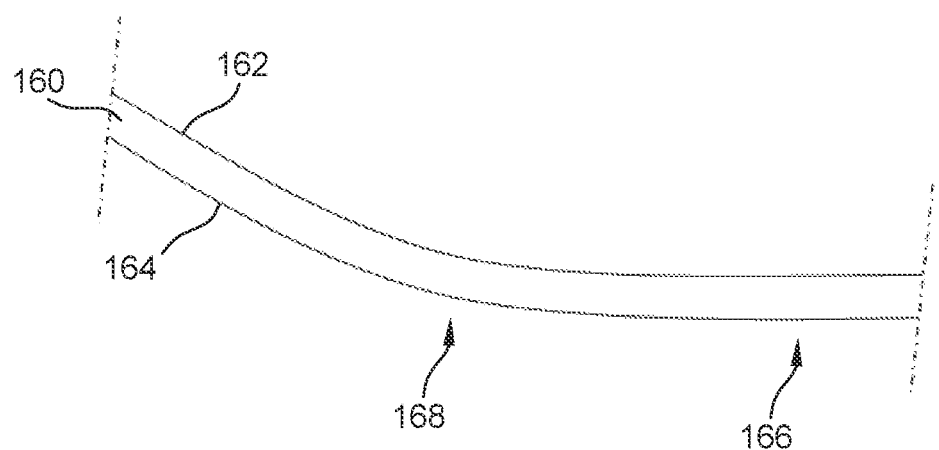
FIG. 1D is a schematic side view of a portion of the component of FIG. 1C.

FIG. 1D is a schematic side view of a portion of component 160. The component 160 may represent any of the front spar 110F, the rear spar 110R, the rib 120, the stiffener 130, or the rib post 140. The component 160 may represent any other item that is to be assembled to one or more further components. Component 160 includes a top surface 162 and a bottom surface 164. As illustrated, in some aspects, the bottom surface 164 of component 160 includes at least one planar portion 166 and at least one non-planar portion 168. The non-planar portion 168 may include any one or more of a kink, a bend, a protrusion, or a depression. In some aspects, the bottom surface 164 of component 160 includes only the planar portion 166. In some aspects, the bottom surface 164 of component 160 includes only the non-planar portion 168.

Figure 2A:
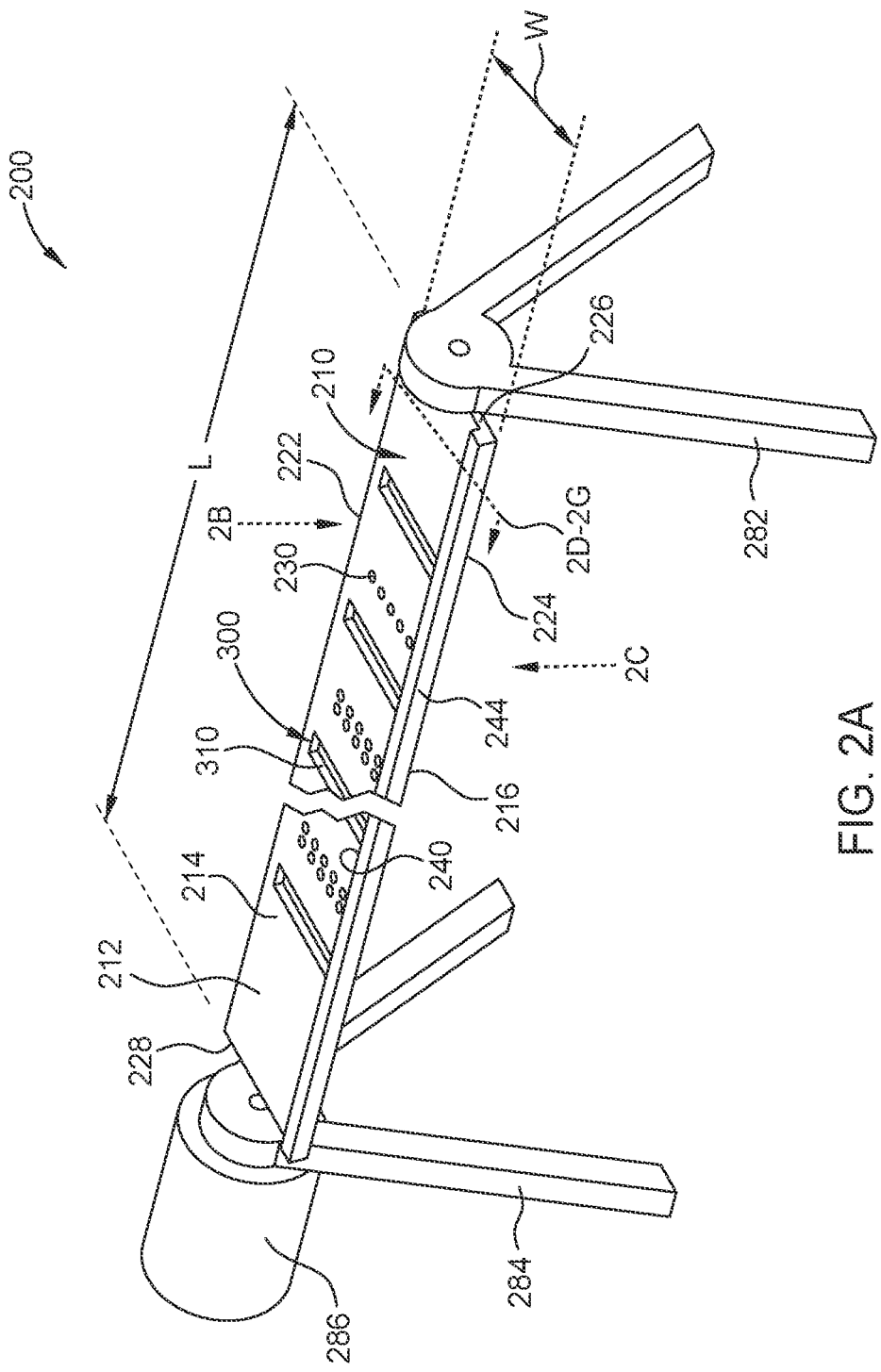
FIGS. 2A to 2I schematically illustrate a system for positioning and drilling components that are to be assembled together.

FIGS. 2A to 2I schematically illustrate a system 200 for positioning and drilling components that are to be assembled together. FIG. 2A is an isometric view of the system 200. The system 200 includes a jig 210. The jig 210 includes a body 212 with a front surface 214 at a front side and a back surface (216, FIG. 2C) opposite the front surface 214 at a back side. Two long edges 222, 224 extend along a length L of the body 212. In some aspects, the two long edges 222, 224 are generally parallel. In some aspects, the two long edges 222, 224 are not generally parallel. Two short edges 226, 228 extend along a width W of the body 212 from one long edge 222 to the other long edge 224. In some aspects, the two short edges 226, 228 are generally parallel. In some aspects, the two short edges 226, 228 are not generally parallel. One or more apertures 230 in the body 212 extend from the front surface 214 to the back surface 216. The apertures 230 provide guidance for the drilling of holes 152 in components (such as spar 110, stiffener 130, rib post 140) mounted on the jig 210. As illustrated, in some aspects, a pocket 300 in the body 212 is formed as a recess in the front surface 214. The pocket 300 includes a sidewall 310 and a floor 320. In some aspects, the jig includes a single pocket 300. In some aspects, the jig includes multiple pockets 300. In some aspects, the pockets 300 may be omitted.

As illustrated, in some aspects a ledge 244 protrudes from the front surface 214, and extends at least partially along the length L of the body 212. The ledge 244 provides an indexing feature 240, such as a reference datum, against which a component may be abutted when positioned on the front surface 214. In the example shown in the Figure, the ledge 244 extends at the long edge 224. In some aspects, the ledge 244 may extend at least partially along at least one of the length L or the width W of the body 212. In an example, the ledge 244 may extend at least partially along the length L of the body 212 only. In another example, the ledge 244 may extend at least partially along the width W of the body 212 only. In some aspects, the ledge 244 may be omitted.

The system 200 further includes supports 282, 284. Support 282 is coupled to the jig 210 at the short edge 226. Support 284 is coupled to the jig 210 at the opposite short edge 228. As illustrated, in some aspects a motor 286 is configured to rotate the jig 210 with respect to, and between, the supports 282, 284 about an axis parallel to the length L of the body 212. In some aspects, the motor 286 is configured to rotate the jig 210 with respect to, and between, the supports 282, 284 about an axis that is not parallel to the length L of the body 212. The motor 286 may be electric, hydraulic, or pneumatic.

The motor 286 may be controlled by a controller. It is contemplated that the controller includes a central processing unit (CPU), a memory containing instructions, and support circuits for the CPU. The controller can be a general-purpose computer processor that is used in an industrial setting for controlling industrial fabrication and robotic equipment. The memory, or non-transitory computer readable medium, is one or more of a readily available memory such as random access memory (RAM), read only memory (ROM), floppy disk, hard disk, flash drive, or any other form of digital storage, local or remote. The support circuits are coupled to the CPU for supporting the CPU (a processor). The support circuits include cache, power supplies, clock circuits, input/output circuitry and subsystems, and the like. Operations and operating parameters are stored in the memory as a software routine that is executed or invoked to turn the controller into a specific purpose controller to control the operations of the system 200. The controller is configured to control the conduct of any of the operations described herein. The instructions stored on the memory, when executed, cause one or more of the operations described herein to be conducted.

Figure 2B:
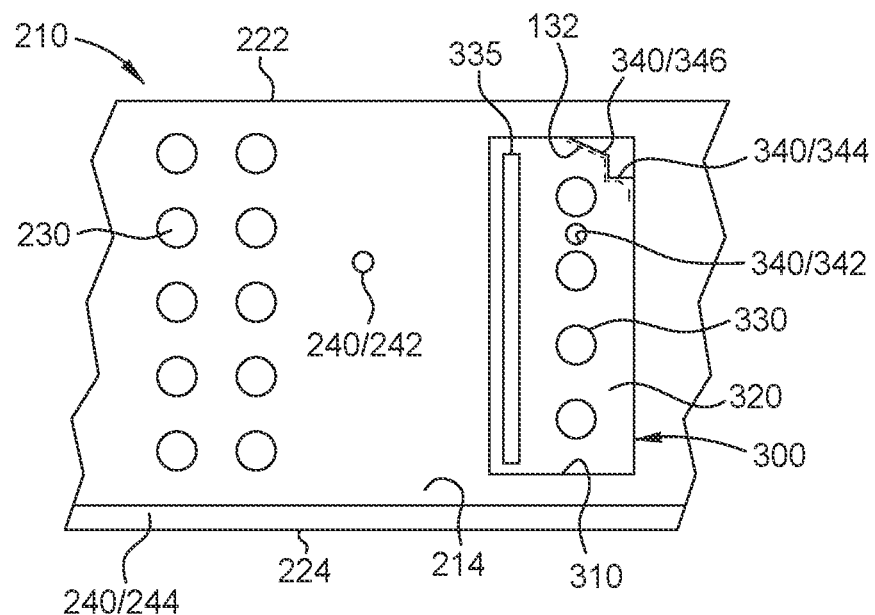

FIG. 2B provides a top view representing a portion of the front surface 214 of the jig 210. Apertures 330 extend from the floor 320 of the pocket 300 through the body 212 of the jig 210 to the back surface 216 of the jig 210. The apertures 330 provide guidance for the drilling of holes (such as holes 152, FIG. 1B) in a component (such as component 160, FIG. 1C, e.g. stiffener 130) located in the pocket 300 and a component (such as another component 160, FIG. 1C, e.g. front spar 110F) overlaying the component in the pocket 300. In the illustrated example, a slot 335 extends from the floor 320 of the pocket 300 to the back surface 216 of the jig 210. The slot 335 enables the jig 210 to accommodate an L-shaped component, such as a stiffener 130, described above. It is contemplated that the jig 210 may include a single pocket 300 or may include multiple pockets 300. Furthermore, the multiple pockets 300 may include pockets of different sizes, differing shapes, or differing orientations.

As illustrated, in some aspects the pocket 300 includes one or more indexing features 340. The one or more indexing features 340 facilitate the positioning of a component in the pocket 300 by aligning the component to a position adjacent the one or more indexing features 340. Exemplary indexing features 340 include an indexing hole 342 that extends from the floor 320 through the body 212 of the jig 210 to the back surface 216, a protrusion 344, and a shaped recess 346. In some aspects, the slot 335 functions as an indexing feature 340. In some aspects, one (or more) of the apertures 330 functions as an indexing feature 340. In some aspects, a component in the pocket 300 may be positioned by aligning an indexing hole (such as indexing hole 172) of the component with the indexing hole 342. In some aspects, a component in the pocket 300 may be positioned by aligning a feature such as shaped recess 176 of the component against the protrusion 344 and/or by aligning a feature such as one of the protrusions 174 of the component against the shaped recess 346. A partial outline of the flange 132 of the stiffener 130 is shown by a dashed line to illustrate the latter examples. In some aspects, the shape of the pocket 300 itself can be used for indexing. In an example, the protrusion 344 and/or the shaped recess 346 are formed by the sidewall 310 of the pocket 300.

In some aspects, the pocket 300 includes a single indexing feature 340. In some aspects, the pocket 300 includes multiple indexing features 340. In an example, the multiple indexing features 340 include more than one indexing feature 340 of the same configuration (e.g. indexing hole 342, protrusion 344, shaped recess 346, slot 335, or aperture 330) or characteristic. In another example, the multiple indexing features 340 include one or more indexing features 340 of a first configuration (such as one of indexing hole 342, protrusion 344, or shaped recess 346) and one or more indexing features 340 of a second, different, configuration (such as a different one of indexing hole 342, protrusion 344, and/or shaped recess 346). In some other aspects, the indexing feature 340 may be omitted from the pocket 300.

In some aspects, one or more pockets 300 may include one or more indexing features 340 of a first configuration, and one or more other pockets 300 may include one or more indexing features 340 of a second, different, configuration. Additionally, or alternatively, one or more other pockets 300 may not include any indexing features 340.

As illustrated, in some aspects the jig 210 includes one or more other indexing features 240 not in a pocket 300. The one or more other indexing features 240 facilitate the positioning of a component (such as component 160, FIG. 1C, e.g. front spar 110F) on the front surface 214 by aligning an indexing feature (such as an indexing feature 170) of the component with the one or more indexing features 240. The one or more other indexing features 240 facilitate the alignment of the component with the jig 210. Exemplary indexing features include the ledge 244, as described above, a datum hole 242, a protrusion (not shown), a shaped recess (not shown), a slot (not shown), or the like. The datum hole 242 extends from the front surface 214 to the back surface 216. In some aspects, one (or more) of the apertures 230 that extend from the front surface 214 to the back surface 216 functions as an indexing feature 240.

In some aspects, the jig 210 includes a single indexing feature 240 not in a pocket 300. In some aspects, the jig 210 includes multiple indexing features 240 not in a pocket 300. In an example, the multiple indexing features 240 include more than one indexing feature 240 of the same configuration (e.g. ledge 244, datum hole 242, protrusion (not shown), shaped recess (not shown), slot (not shown), or aperture 230) or characteristic. In another example, the multiple indexing features 240 include one or more indexing features 240 of a first configuration (such as one of ledge 244, datum hole 242, protrusion (not shown), shaped recess (not shown), slot (not shown), or aperture 230) and one or more indexing features 240 of a second, different, configuration (such as a different one of ledge 244, datum hole 242, protrusion (not shown), shaped recess (not shown), slot (not shown), or aperture 230).

Figure 2C:
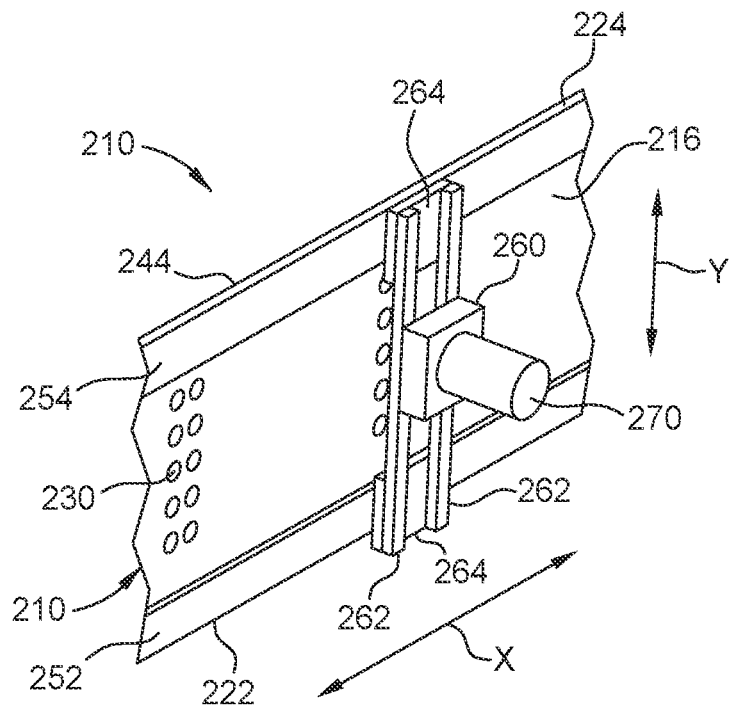
Figure 2D:
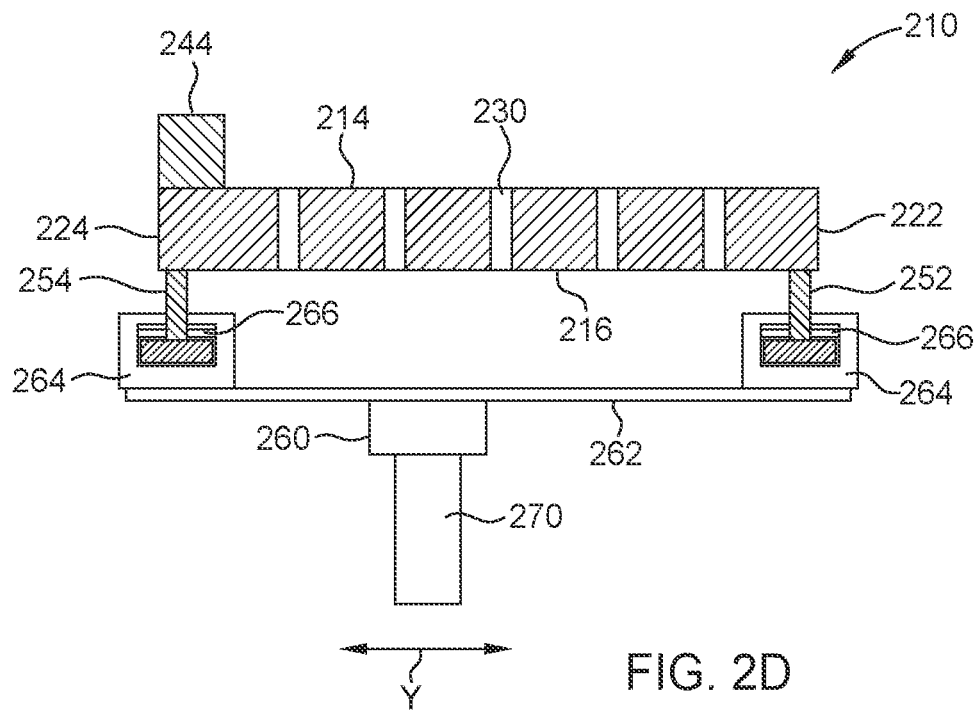
Figure 2E:
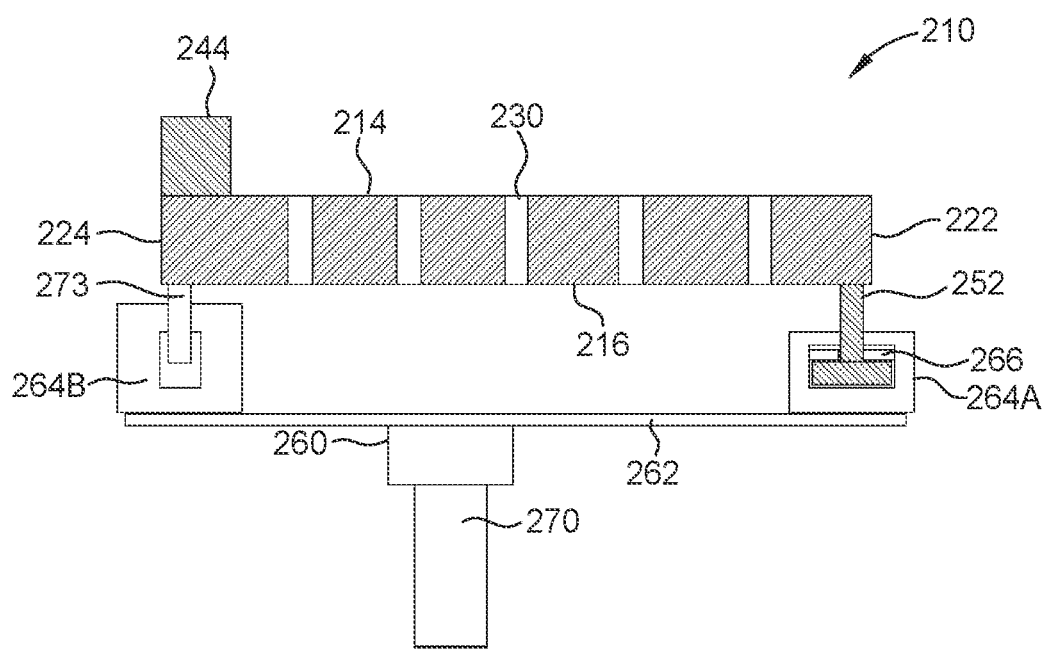
Figure 2F:
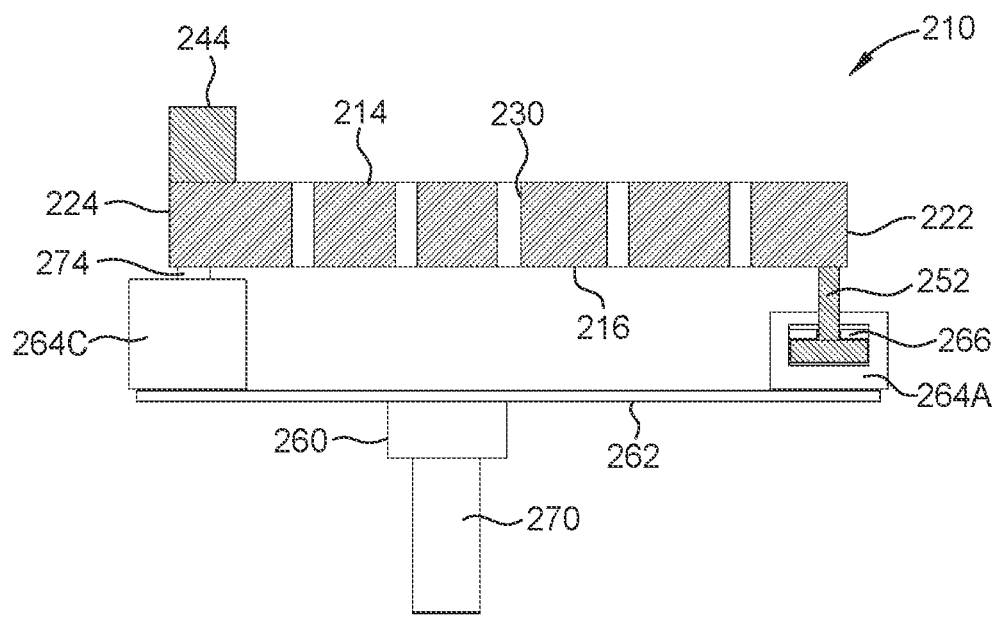
Figure 2G:
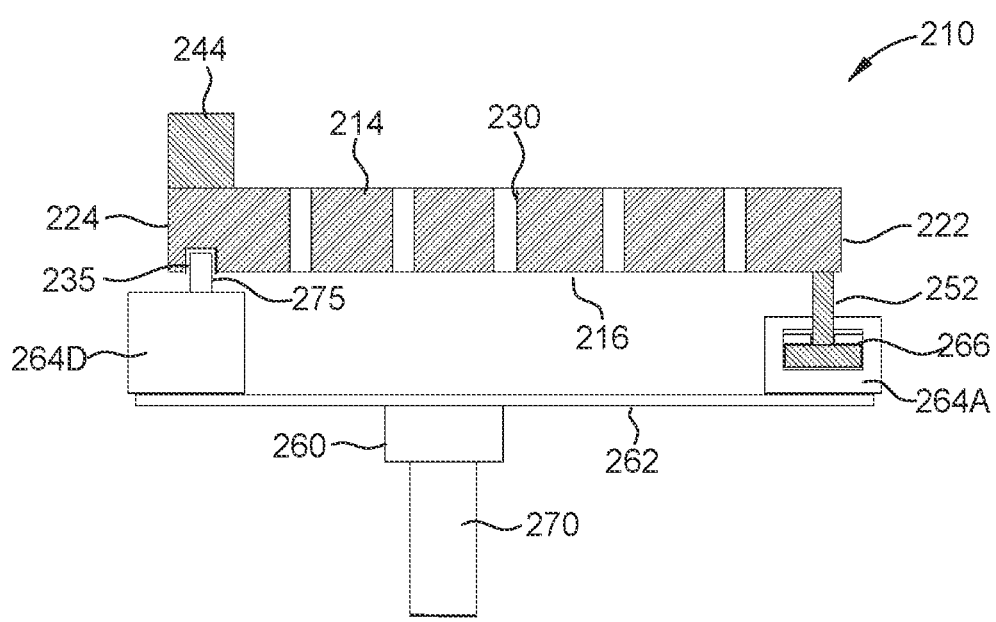

FIG. 2C provides a view representing a portion of the back surface 216 of the jig 210, and FIG. 2D is a cross-sectional view through the jig 210. A track 252 extends at least partially along the length L of the body 212. As illustrated, in some aspects, the track 252 extends along the back surface 216 at the long edge 222. In some aspects, another track 254 extends at least partially along the length L of the body 212. As illustrated, in some aspects, the track 254 extends along the back surface 216 at the long edge 224. The tracks 252, 254 are generally parallel to each other. In some aspects, the tracks 252, 254 are mounted to run parallel to the back surface 216. In some aspects, the tracks 252, 254 are mounted to run parallel to the front surface 214.

A carriage 260 is mounted to the tracks 252, 254, and adjacent the back surface 216. The carriage 260 is mounted to the tracks 252, 254 via rails 262. The rails 262 are coupled to adapters 264 mounted to each track 252, 254. The carriage 260 is configured for movement in an X direction along the tracks 252, 254. In some aspects, movement in the X direction is facilitated by wheels or by rollers 266 of each adapter 264 that engage with a corresponding track 252, 254. In an example, the wheels or rollers 266 are powered to propel the carriage 260 in the X direction. The carriage 260 is configured for movement in a Y direction (perpendicular to the X direction) along the rails 262. In some aspects, movement in the Y direction is facilitated by one or more hydraulic or pneumatic cylinders. In some aspects, the carriage 260 includes a gimbal system (not shown) that facilitates additional degrees of freedom of movement.

In some aspects, one of track 252 or track 254 may be omitted. In an example, only one track (252 or 254) is present. In such aspects, one of the adapters 264 is mounted to the track 252/254, and the other of the adapters 264 engages the back surface 216. In an example illustrated schematically in FIG. 2E, the adapter 264A engages the track 252, whereas the adapter 264B engages the back surface 216 with one or more wheels/rollers 273 that make rolling contact with the back surface 216. In another example illustrated schematically in FIG. 2F, the adapter 264A engages the track 252, whereas the adapter 264C engages the back surface 216 with a ski 274 that makes a sliding contact with the back surface 216. In another example illustrated schematically in FIG. 2G, the adapter 264A engages the track 252, whereas the adapter 264D engages the back surface 216 with a key 275 that makes a sliding contact within a channel 235 in the back surface 216 or in the long edge 224.

Figure 2H:
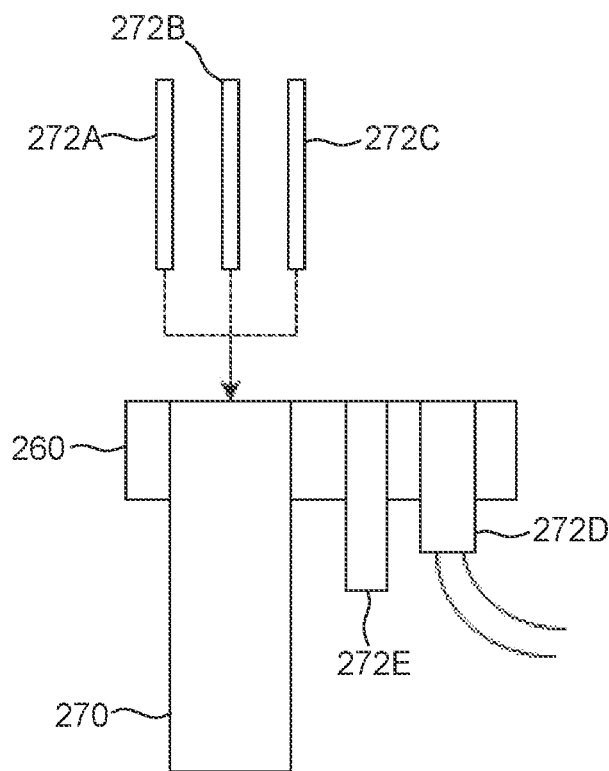

A drill 270 is mounted to the carriage 260. In some aspects, the drill 270 is a computer numerical control (CNC) machine. As schematically illustrated in FIG. 2H, drill 270 includes one or more tools 272, such as a drill bit 272A, configured for creating holes in components (such as component 160) that are mounted to the jig 210. In some aspects, the drill 270 includes one or more other tools 272. Exemplary tools 272 include routers 272B, finishing tools 272C (such as for deburring), or the like. In some aspects, the drill 270 is mounted to the carriage 260 with an adjustment mechanism (not shown, such as a gimbal) to enable positioning of a tool 272 of the drill 270 (such as the drill bit 272A) at a desired orientation with respect to a component mounted to the jig 210. In an example, the adjustment mechanism enables the positioning of an axis of the drill bit 272A to be normal to a component mounted to the jig 210.

In some aspects, one or more other tools 272 are mounted to the carriage 260 and/or the drill 270. Exemplary other tools 272 may include a vacuum extractor 272D for removing drilling debris. Exemplary other tools 272 may include a sensor 272E (such as a camera, or a measurement tool, such as a laser measurer) to aid positioning of the drill 270 or for viewing and/or inspecting the work performed by the drill 270. It is contemplated that operation of the carriage 260, the drill 270, and any tool 272 mounted to the carriage 260 or to the drill 270 may be controlled by the controller described above.

Figure 2I:
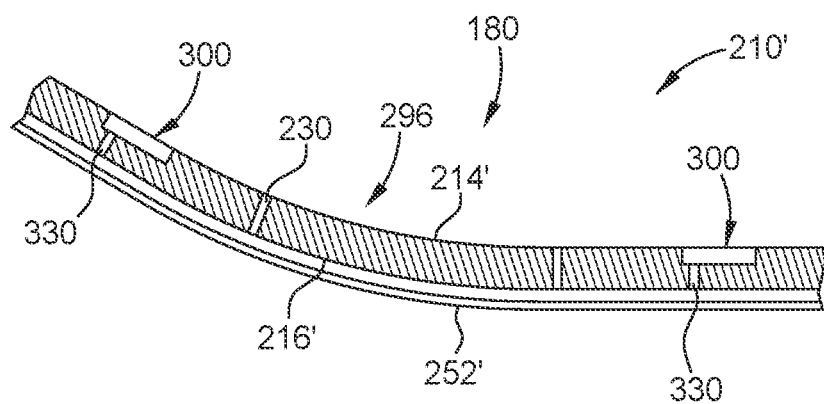

FIG. 2I is a schematic longitudinal cross-sectional view of a portion of a jig 210' that accommodates components (such as component 160, FIG. 1D) whose bottom surface (such as bottom surface 164) includes a non-planar portion (such as non-planar portion 168). The jig 210' is configured similarly to jig 210. The front surface 214' of the jig 210' includes a contour 296. As illustrated, in some aspects, the back surface 216' remains generally parallel to the front surface 214' at and beyond the contour 296. The front surface 214' defines a nominal shape 180 of a component (such as component 160) that is to be positioned against the front surface 214'. As illustrated, in some aspects, each track (only track 252' is illustrated) remains generally parallel to the front surface 214' at and beyond the contour 296. As illustrated, in some aspects, each track (e.g. 252') remains generally parallel to the back surface 216' at and beyond the contour 296.

FIGS. 3A to 3G schematically illustrate aspects of using the system 200 to arrange components that are to be assembled together, and preparing the components for assembly by drilling one or more holes through corresponding components. In FIGS. 3A to 3G and the accompanying description, it is to be understood that references to jig 210 and any aspect of jig 210 encompass jig 210' and any aspect of jig 210'.

Figure 3A:
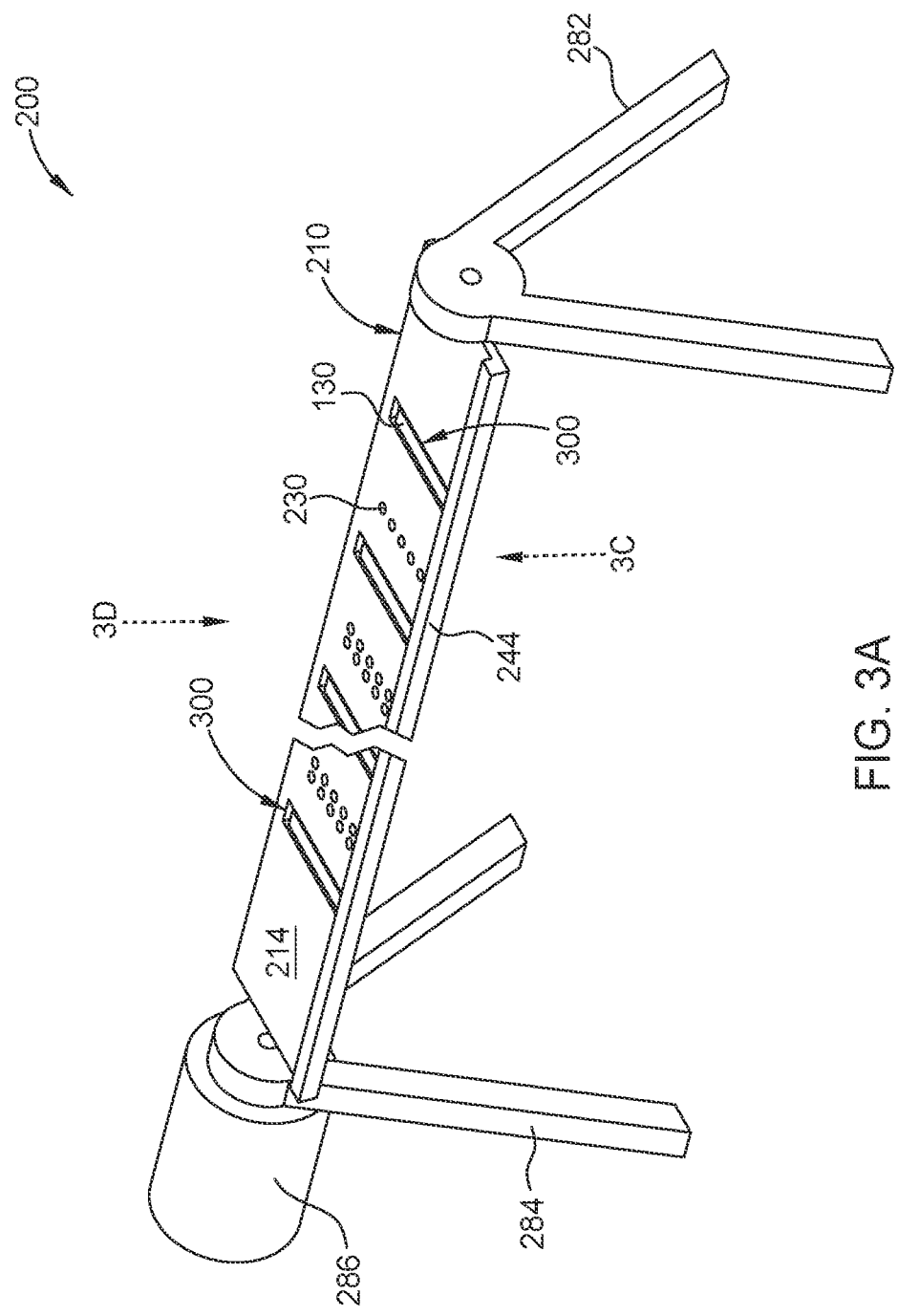
FIGS. 3A to 3G schematically illustrate aspects of using the system of FIGS. 2A to 2I to arrange components that are to be assembled together, and aspects of preparing the components for assembly by drilling one or more holes through corresponding components.

In FIG. 3A, stiffeners 130 are shown in the pockets 300 of the jig 210. In some aspects, each stiffener 130 is aligned to a position adjacent an indexing feature 340 of the corresponding pocket 300, such as described above. In some aspects, each stiffener 130 is secured in the aligned position by tooling pins, such as screws, studs, bolts, pins, or the like.

Figure 3B:
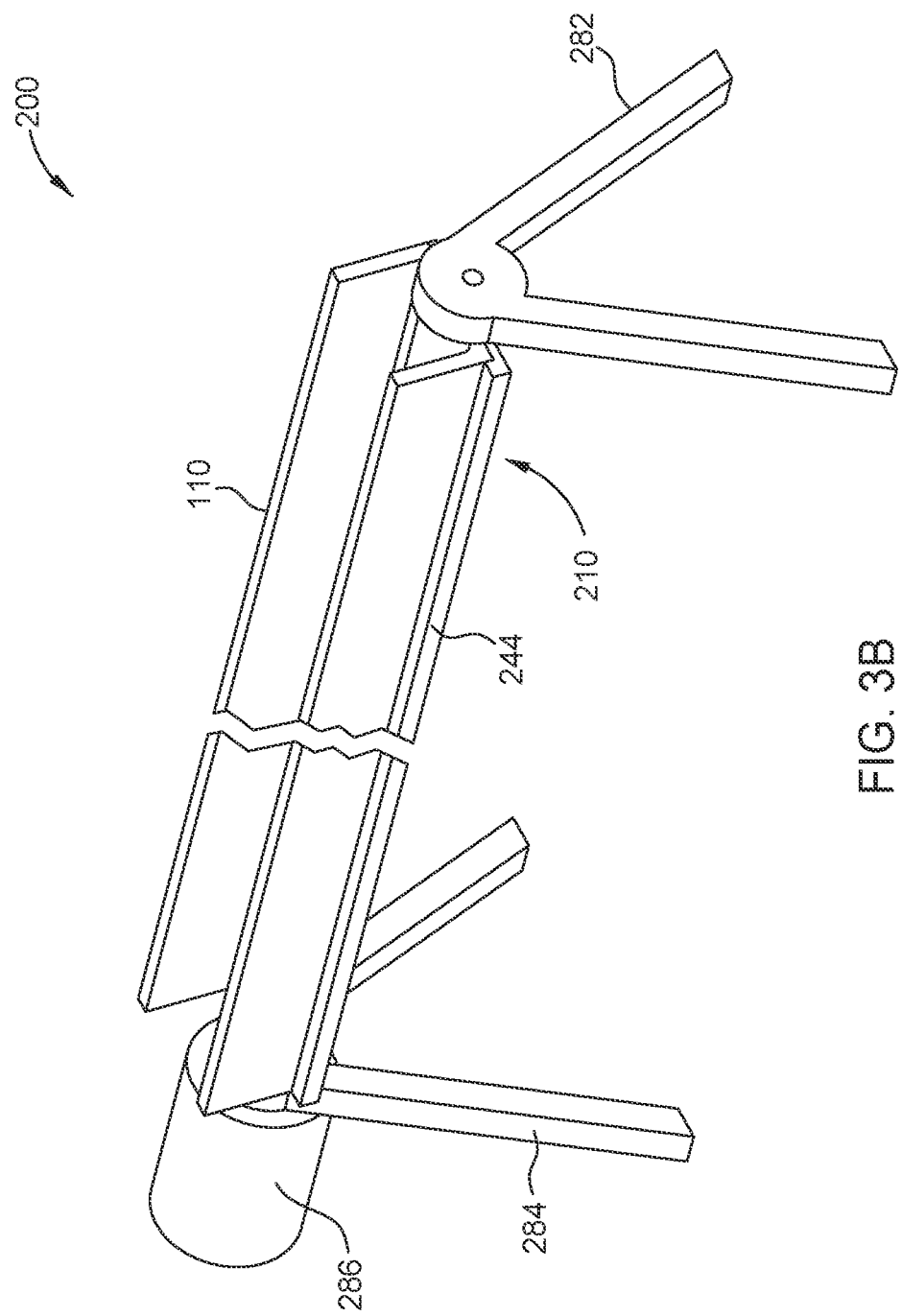

In FIG. 3B, a spar 110 (such as the front spar 110F or the rear spar 110R) is shown positioned against the front surface 214 of the jig 210 and over the stiffeners 130. As illustrated, the spar 110 is aligned with, and abuts, the ledge 244. In some aspects, the spar 110 may be further positioned by alignment of a portion of the spar with another indexing feature 240, such as a second ledge (not shown). In some aspects, the spar 110 may be further positioned by aligning a feature such as shaped recess 176 (FIG. 1C) of the spar 110 with a protrusion of the jig 210 and/or by aligning a feature such as a protrusion 174 (FIG. 1C) of the spar 110 with a shaped recess of the jig 210. In some aspects, the spar 110 may be further positioned by alignment of an indexing hole such as indexing hole 172 (FIG. 1C) with a datum hole 242 of the jig 210, such as described above.

Figure 3C:
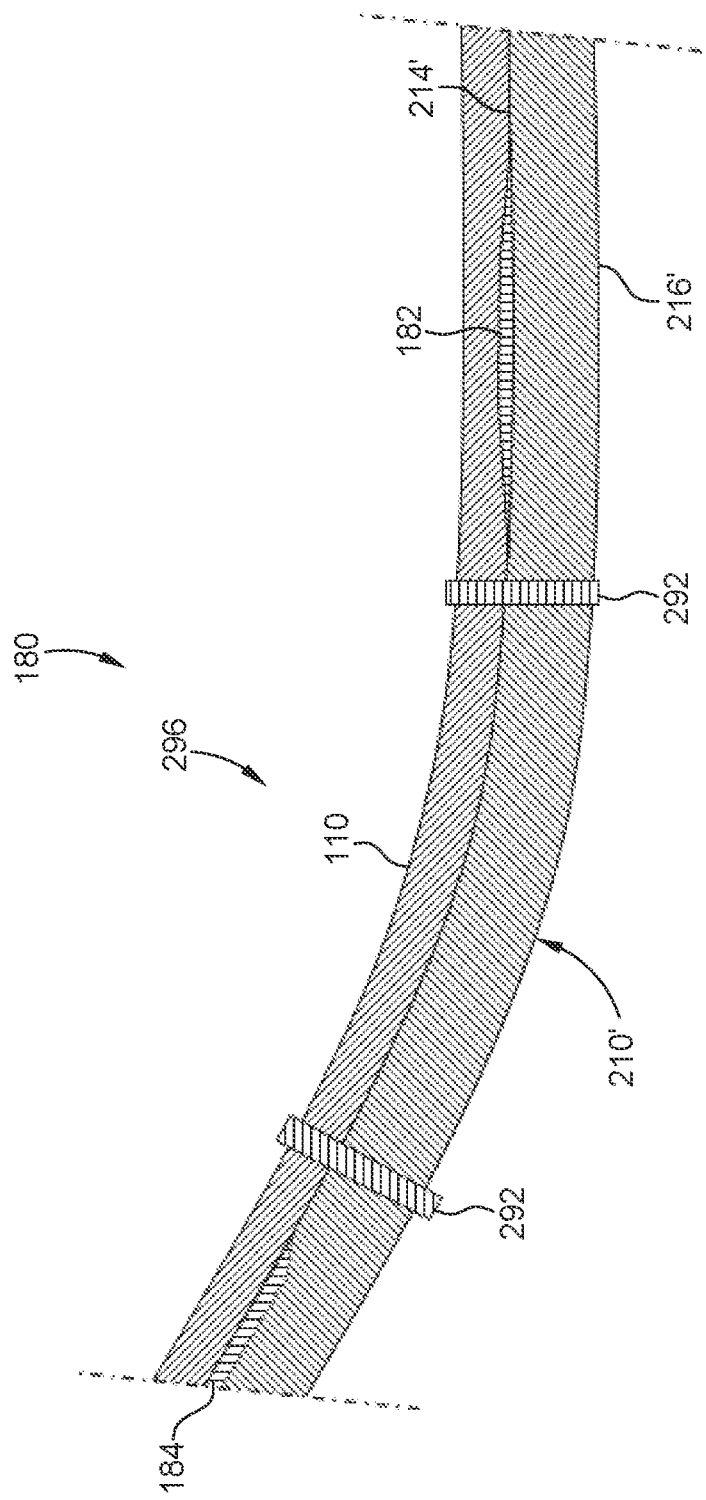

In some aspects, the spar 110 is conformed to the nominal shape (180, FIG. 2I) defined by the front surface 214 within a predefined tolerance. In some aspects, conforming the spar 110 to the nominal shape 180 includes conforming the spar 110 to a contour, such as the contour 296 of the jig 210'. FIG. 3C is a schematic longitudinal cross-sectional view of a portion of the jig 210' illustrating the conforming of the spar 110 to the contour 296. In some aspects, conforming the spar 110 to the nominal shape 180 includes at least one of: applying a preload to at least a portion of the spar 110; removing material from a portion of the spar 110; or adding a shim 182 between a portion of the spar 110 and the front surface 214'.

In an example, portion 184 represents the material removed from a portion of the spar 110 to enable the spar 110 to conform to the contour 296. In some aspects, adding a shim 182 between a portion of the spar 110 and the front surface 214' includes adhering the shim 182 to the spar 110. In some aspects, adding a shim 182 between a portion of the spar 110 and the front surface 214' includes applying the shim 182 in liquid form, and allowing the liquid to set. The shim 182 adheres to the spar 110 such that the spar 110 retains the nominal shape 180.

In some aspects, the spar 110 is secured to the jig 210/210' in the aligned position by tooling pins 292, such as described above. In some aspects, the spar 110 is secured to the jig 210/210' by tooling pins 292, such as described above, after conforming the spar 110 to the nominal shape 180 defined by the front surface 214/214' within a predefined tolerance. The tooling pins 292 are configured to hold the spar 110 on the front surface 214/214' in conformance to the nominal shape 180 within a predefined tolerance. In some aspects, the spar 110 is secured against the contour 296, such as by tooling pins 292, such as described above.

Figure 3D:
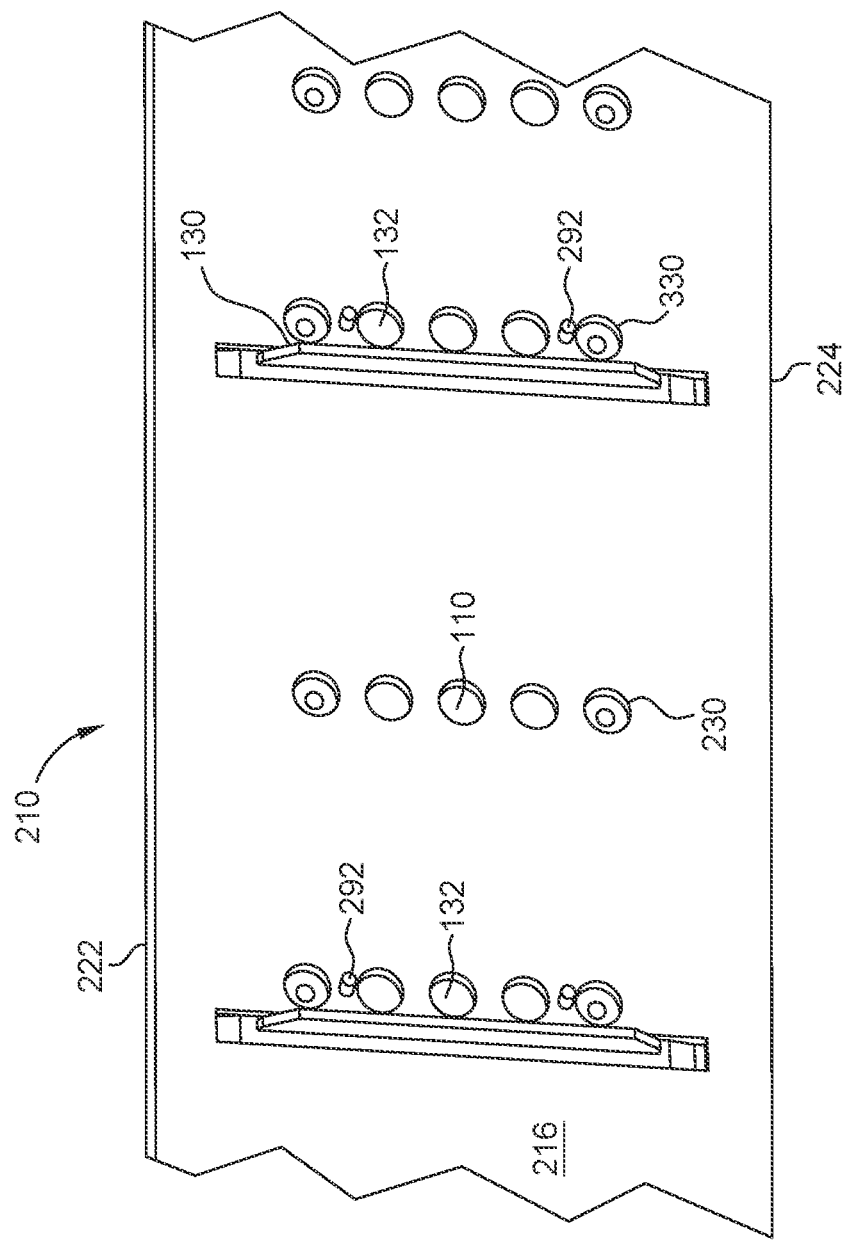

FIG. 3D is a view of a portion of the back surface 216 of the jig 210 after positioning the spar 110. For clarity, the tracks 252, 254 have been omitted. Each stiffener 130 is shown protruding through a corresponding slot 335, and the flange 132 of each stiffener 130 is visible through the apertures 330 that extend from the floor 320 of each pocket 300 to the back surface 216. As illustrated, tooling pins 292 secure the stiffeners 130 to the jig 210. In some aspects, one or more of the tooling pins 292 secure the stiffeners 130 to the spar 110.

Figure 3E:
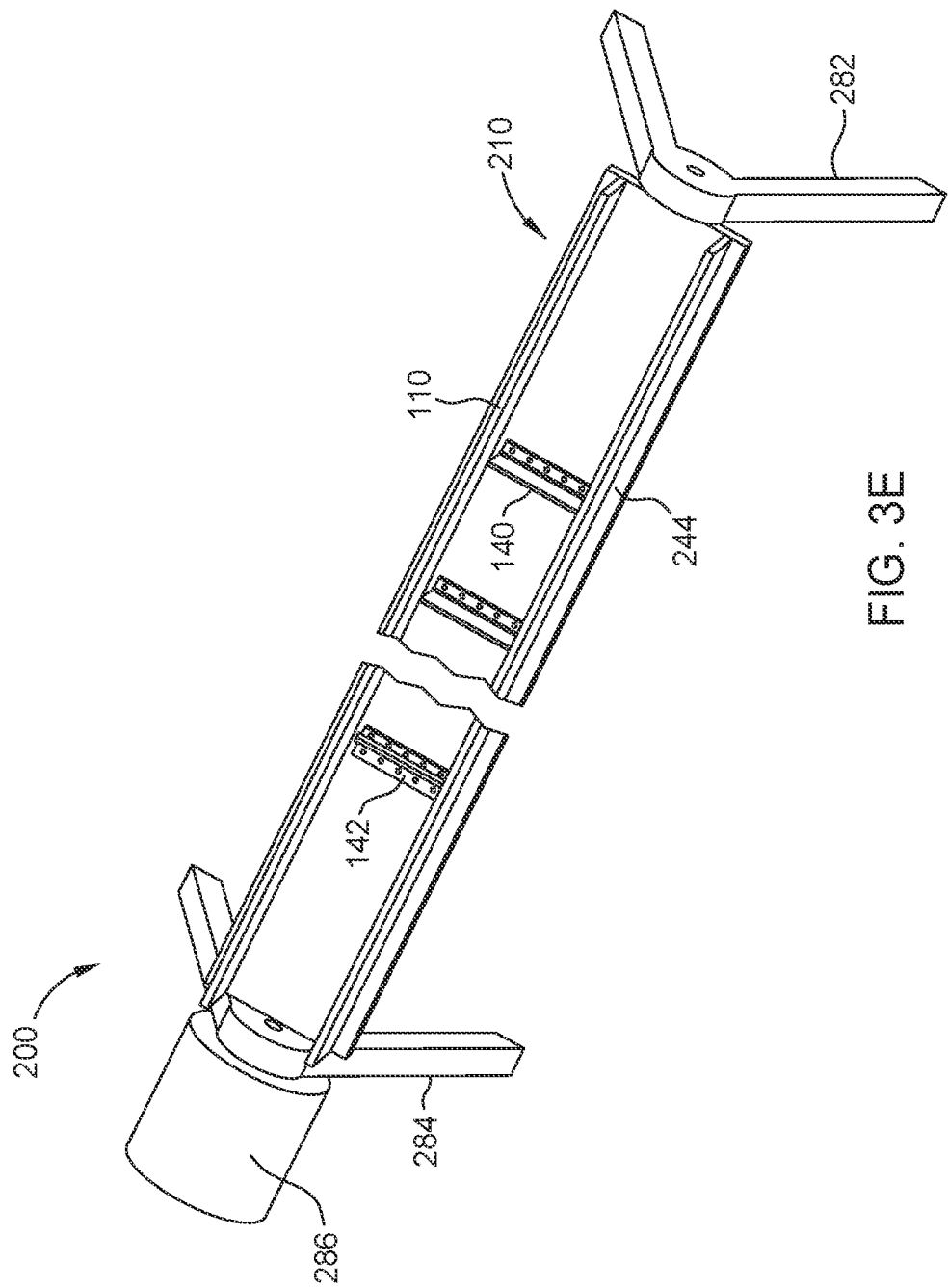

In FIG. 3E, rib posts 140 are shown positioned on the spar 110. In some aspects, each rib post 140 is aligned to a position adjacent an indexing feature of the spar 110. In an example, one or more indexing holes (such as indexing hole 172, FIG. 1C) in the flange 142 of each rib post 140 is aligned with a corresponding indexing hole (e.g. indexing hole 172) in the spar 110. In some aspects, each rib post 140 is secured in the aligned position by tooling pins 292, such as described above.

Figure 3F:
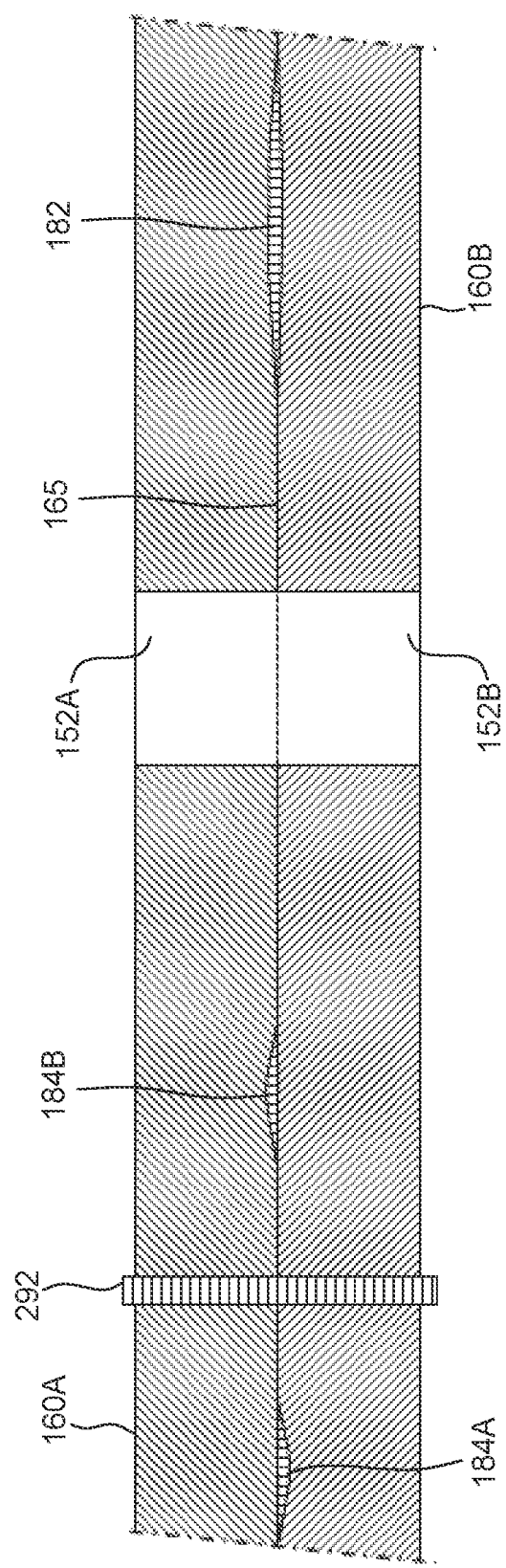

In some aspects, one or more contacting surfaces of any two components (such as the spar 110, stiffener 130, and/or rib post 140) may be adjusted to conform to each other while the components are on the jig 210/210'. FIG. 3F is a schematic longitudinal cross-sectional view illustrating the conformance of two components, represented as component 160A and component 160B, to each other. Such a conformance places component 160A and component 160B in a nominal configuration within a predefined tolerance. Each component 160A, 160B may represent any of the spar 110, front spar 110F, the rear spar 110R, the rib 120, the stiffener 130, the rib post 140, or any other item that is to be assembled to one or more further components.

Component 160A is shown on top of component 160B. In some aspects, conforming component 160A to component 160B includes at least one of: applying a preload to at least a portion of component 160A; applying a preload to at least a portion of component 160B; removing material from a portion of component 160A; removing material from a portion of component 160B; or adding a shim 182 between a portion of component 160A and a portion of component 160B.

In an example, portion 184A represents the material removed from a portion of component 160A to enable component 160A to conform to component 160B. In another example, portion 184B represents the material removed from a portion of component 160B to enable component 160A to conform to component 160B. In some aspects, adding a shim 182 between a portion of component 160A and a portion of component 160B includes adhering the shim 182 to component 160A or to component 160B. In some aspects, adding a shim 182 between a portion of component 160A and a portion of component 160B includes applying the shim 182 in liquid form, and allowing the liquid to set. The shim 182 adheres to component 160A or to component 160B such that the component 160A or 160B to which the shim 182 is adhered retains a shape that conforms to the other of component 160A or 160B.

In some aspects, component 160A is secured to component 160B by tooling pins 292, such as described above. In some aspects, component 160A is secured to component 160B by tooling pins 292, such as described above, after conforming component 160A with component 160B within a predefined tolerance. The tooling pins 292 are configured to hold component 160A to component 160B within a predefined tolerance.

Figure 3G:
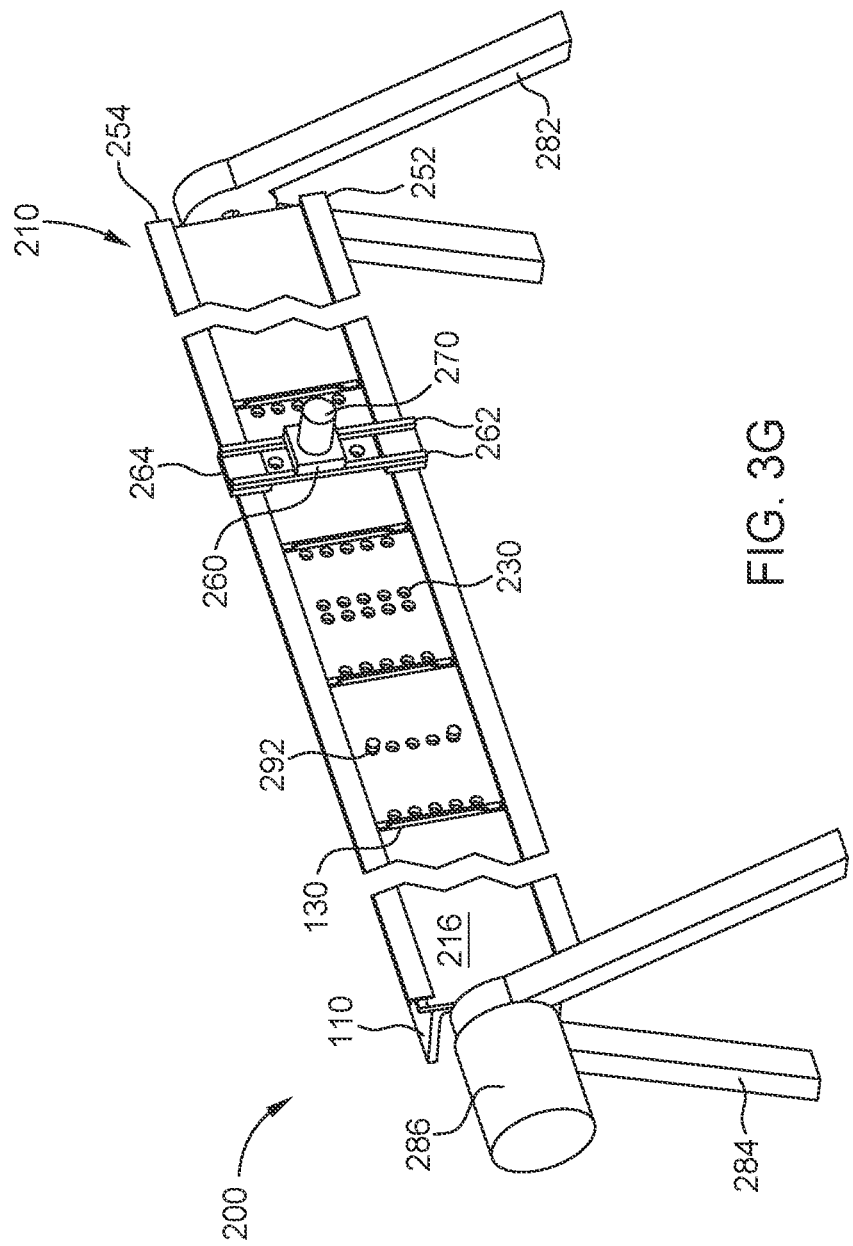

FIG. 3F illustrates a hole 152A through component 160A that is aligned with a hole 152B through component 160B. The hole 152A is continuous with the hole 152B through the interface 165 of component 160A with component 160B. FIG. 3G shows a drilling operation for creating the holes (e.g. hole 152 (FIG. 1B), holes 152A, 152B (FIG. 3F)) in the components (e.g. component 160, component 160A, component 160B, spar 110, front spar 110F, rear spar 110R, stiffeners 130, rib posts 140) for the fasteners (150, FIG.

1B). In some aspects, the drilling operation is conducted while the front surface 214 of the jig 210 faces upwards. In some aspects, the drilling operation is conducted while the front surface 214 of the jig 210 faces downwards. As illustrated, in some aspects, the drilling operation is conducted while the front surface 214 of the jig 210 faces sideward. The motor 286 may be operated to rotate the jig 210 to any orientation as required.

The drilling operation is conducted from the back side of the jig 210. The carriage 260 moves along the tracks 252, 254 and along the rails 262 to position the drill 270 at each aperture 230, 330. In some aspects, alignment of the drill 270 with each aperture 230, 330 may be verified, such as via position sensors (e.g. sensor 272E, FIG. 2H) communicating with the controller, before the drill 270 creates a hole 152. In some aspects, the controller may verify that the drill bit (272A, FIG. 2H) of the drill 270 is aligned normal to the component surface (such as bottom surface 164, FIG. 1D) that is facing the drill 270 before the drill 270 creates a hole 152. In an example, the controller may verify that the drill bit 272A of the drill 270 is aligned normal to the front surface 214 of the jig 210. In aspects in which the back surface 216 of the jig 210 is parallel to the front surface 214 of the jig 210, the controller may verify that the drill bit 272A of the drill 270 is aligned normal to the back surface 216 of the jig 210 before the drill 270 creates a hole 152.

To create a hole, the drill 270 moves the drill bit 272A through an aperture 230, 330 of the jig 210 before contacting and penetrating the corresponding components (e.g. component 160, component 160A, component 160B, spar 110, front spar 110F, rear spar 110R, stiffeners 130, rib posts 140). In some aspects, the hole created by the drill 270 is inspected while the components remain on the jig 210. In an example, the sensor 272E (such as a camera, or a measurement tool, such as a laser measurer) mounted to the carriage 260 scans, images, probes, or otherwise investigates the size, geometry, orientation, or surface finish of the hole 152. In some aspects, operation of the drill 270 and the performance of any post-drilling inspection are controlled by the controller.

In some aspects, the drill 270 creates a hole 152 through multiple components in a single operation. In an example, the drill 270 creates a hole 152 through the flange 132 of the stiffener 130 and through the spar 110 in a single operation. The hole 152 through the flange 132 of the stiffener 130 is aligned with the hole 152 through the spar 110. In another example, the drill 270 creates a hole 152 through the flange 142 of the rib post 140 and through the spar 110 in a single operation. The hole 152 through the flange 142 of the rib post 140 is aligned with the hole 152 through the spar 110. In some aspects, the drill creates a hole 152 through only a single component in a single operation. In an example, the drill 270 creates a hole 152 only through the spar 110. In any of the above scenarios and examples, the hole 152 may be a pilot hole that is to be opened up later, such as during the eventual assembly of the components. Alternatively, the hole 152 may be created by the drill 270 to a size corresponding to a size of the fastener (such as fastener 150) during the eventual assembly of the components. In an example, the fastener 150 is sized for an interference fit in the hole 152.

Figure 4:
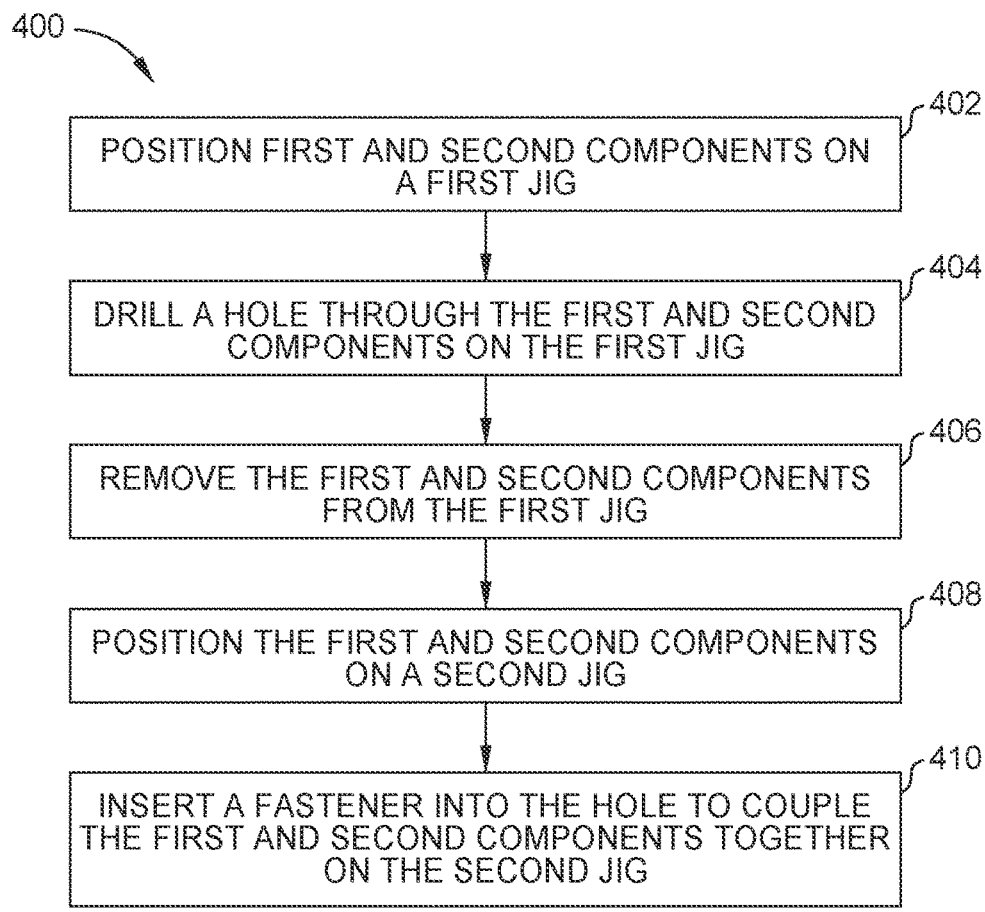
FIG. 4 is a flowchart of a method of manufacturing an assembly of components.

FIG. 4 is a flowchart of a method 400 of manufacturing an assembly of components. The components may include any of component 160, component 160A, component 160B, spar 110, front spar 110F, rear spar 110R, stiffeners 130, rib posts 140 described herein. At operation 402, first and second components are positioned on a first jig, such as the jig 210 or 210'. In some aspects, the first jig is situated at a first factory location. In some aspects, a surface (such as front surface 214/214') of the first jig defines a nominal shape (such as nominal shape 180) of the first component. In some aspects, operation 402 includes conforming the first component to the nominal shape within a predefined tolerance.

In some aspects, conforming the first component to the nominal shape includes at least one of: applying a preload to at least a portion of the first component; removing material (such as portion 184) from a portion of the first component; or adding a shim (such as shim 182) between a portion of the first component and the surface. In some aspects, adding a shim between a portion of the first component and the surface includes adhering the shim to the first component. In some aspects, adding a shim between a portion of the first component and the surface includes applying the shim in liquid form, and allowing the liquid to set.

In some aspects, operation 402 includes aligning at least one of the first or second components to a desired orientation with respect to the first jig. In an example, at least one of the first or second components is aligned with an indexing feature (e.g. indexing feature 240/340) of the first jig, such as described herein. For instance, one or more indexing features (such as one or more of the indexing features 170) of at least one of the first or second components is aligned to a position adjacent one or more corresponding features (e.g. 240, 340) of the first jig.

In some aspects, operation 402 includes aligning the first and second components to a desired juxtaposition with respect to each other. In an example, at least one of the first or second components is aligned with an indexing feature (e.g. one or more of the indexing features 170) of the other of the first or second components, such as described herein. For instance, one or more indexing features (such as one or more of the indexing features 170) of at least one of the first or second components is aligned to a position adjacent one or more corresponding features (e.g. one or more of the indexing features 170) of the other of the first or second components.

In some aspects, operation 402 includes placing the first and second components into a nominal configuration with respect to each other. In an example, placing the first and second components in a nominal configuration with respect to each other includes conforming the first and second components to each other. In some aspects, conforming the first and second components to each other includes at least one of: applying a preload to at least a portion of the first component; applying a preload to at least a portion of the second component; removing material (such as portion 184A) from a portion of the first component; removing material (such as portion 184B) from a portion of the second component; or adding a shim 182 between a portion of the first component and a portion of the second component.

In some aspects, adding a shim between a portion of the first component and a portion of the second component includes adhering the shim to the first component. In some aspects, adding a shim between a portion of the first component and a portion of the second component includes adhering the shim to the second component. In some aspects, adding a shim between a portion of the first component and a portion of the second component includes applying the shim in liquid form, and allowing the liquid to set. In some aspects, operation 402 includes placing the first and second components into a nominal configuration with respect to each other by conforming the first and second components to each other within a predefined tolerance.

In some aspects, operation 402 includes securing at least one of the first or second components to the first jig after conforming the first component to the nominal shape within the predefined tolerance. In some aspects, the securing to the first jig may be by applying one or more tooling pins (such as tooling pins 292), such as described herein. In some aspects, operation 402 includes securing the first and second components to each other. In some aspects, the securing of the first and second components to each other may be by applying one or more tooling pins (such as tooling pins 292), such as described herein.

At operation 404, a hole (such as hole 152, 152A, 152B) is drilled through the first and second components on the first jig. In some aspects, the hole is drilled through the first and second components in a single drilling operation. In some aspects, the hole is drilled through an interface (such as interface 165) of the first and second components. In some aspects, the hole is drilled as described herein. In some aspects, the hole is a pilot hole. In some aspects, the hole is drilled to a size corresponding to a size of a fastener, such as fastener 150. In some aspects, operation 404 includes creating the hole from the back side of the first jig. In some aspects, operation 404 includes creating the hole with a drill bit (such as drill bit 272A) of a drill, such as drill 270. In some aspects, operation 404 includes moving the drill bit of the drill through an aperture (such as aperture 230/330) of the first jig before contacting and penetrating the first and second components.

In some aspects, method 400 includes inspecting the hole while the first and second components are on the first jig. In some aspects, inspecting the hole includes using a tool (such as at least one of the tools 272) mounted to a carriage (such as carriage 260). In some aspects, the tool is a sensor (e.g. sensor 272E). In some aspects, the sensor is a camera. In some aspects, the sensor is a measurement tool, such as a laser measurer. In some aspects, inspecting the hole includes using the tool to scan, image, probe, or otherwise investigate the size, geometry, orientation, or surface finish of the hole.

At operation 406, the first and second components are removed from the first jig. In some aspects, operation 406 includes separating the first and second components.

At operation 408, the first and second components are positioned on a second jig, such as the jig 210 or 210'. In some aspects, the second jig is situated at a second factory location. The second factory location is different from the first factory location. In some aspects, the second factory location is in a different building to a building housing the first factory location. In some aspects, the second factory location is in a different portion of the building in which the first factory location is housed. In some aspects, the first and second components are transported from the first factory location to the second factory location between operation 406 and operation 408. In an example, the first and second components are transported together from the first factory location to the second factory location between operation 406 and operation 408. In another example, the first and second components are transported separately from the first factory location to the second factory location between operation 406 and operation 408.

In some aspects, a surface (such as front surface 214/214') of the second jig defines the nominal shape (such as nominal shape 180) of the first component. In some aspects, operation 408 includes verifying that the first component conforms to the nominal shape within a predefined tolerance. In some aspects, operation 408 includes conforming the first component to the nominal shape within a predefined tolerance, such as described herein.

In some aspects, operation 408 includes aligning at least one of the first or second components to a desired orientation with respect to the second jig. In an example, at least one of the first or second components is aligned with an indexing feature (e.g. indexing feature 240/340) of the second jig, such as described herein. For instance, one or more indexing features (such as one or more of the indexing features 170) of at least one of the first or second components is aligned to a position adjacent one or more corresponding features (e.g. 240, 340) of the second jig.

In some aspects, operation 408 includes aligning the first and second components to a desired juxtaposition with respect to each other. In an example, at least one of the first or second components is aligned with an indexing feature (e.g. one or more of the indexing features 170) of the other of the first or second components, such as described herein. For instance, one or more indexing features (such as one or more of the indexing features 170) of at least one of the first or second components is aligned to a position adjacent one or more corresponding features (e.g. one or more of the indexing features 170) of the other of the first or second components.

In some aspects, operation 408 includes placing the first and second components into a nominal configuration with respect to each other. In an example, placing the first and second components in a nominal configuration with respect to each other includes conforming the first and second components to each other. In some aspects, conforming the first and second components to each other includes at least one of: applying a preload to at least a portion of the first component; applying a preload to at least a portion of the second component; removing material (such as portion 184A) from a portion of the first component; removing material (such as portion 184B) from a portion of the second component; or adding a shim 182 between a portion of the first component and a portion of the second component.

In some aspects, adding a shim between a portion of the first component and a portion of the second component includes adhering the shim to the first component. In some aspects, adding a shim between a portion of the first component and a portion of the second component includes adhering the shim to the second component. In some aspects, adding a shim between a portion of the first component and a portion of the second component includes applying the shim in liquid form, and allowing the liquid to set. In some aspects, operation 408 includes placing the first and second components into a nominal configuration with respect to each other by conforming the first and second components to each other within a predefined tolerance.

In some aspects, operation 408 includes securing at least one of the first or second components to the first jig after conforming the first component to the nominal shape within the predefined tolerance. In some aspects, the securing to the first jig may be by applying one or more tooling pins (such as tooling pins 292), such as described herein. In some aspects, operation 408 includes securing the first and second components to each other. In some aspects, the securing of the first and second components to each other may be by applying one or more tooling pins (such as tooling pins 292), such as described herein.

In some aspects, a pre-assembly operation is performed on at least one of the first or second components between operations 406 and 408. In some aspects, the pre-assembly operation includes at least one of cleaning up drilling debris; deburring; applying a primer; anodizing; or applying a seal, such as a fay seal.

In some aspects, method 400 includes inspecting the hole while the first and second components are on the second jig. In some aspects, inspecting the hole includes using a tool (such as at least one of the tools 272) mounted to a carriage (such as carriage 260). In some aspects, the tool is a sensor (e.g. sensor 272E). In some aspects, the sensor is a camera. In some aspects, the sensor is a measurement tool, such as a laser measurer. In some aspects, inspecting the hole includes using the tool to scan, image, probe, or otherwise investigate the size, geometry, orientation, or surface finish of the hole.

At operation 410, a fastener, such as fastener 150, is inserted into the hole to couple the first and second components together on the second jig. In some aspects, the fastener is an interference fit in the hole. In some aspects, the fastener is not an interference fit in the hole.

Figure 5:
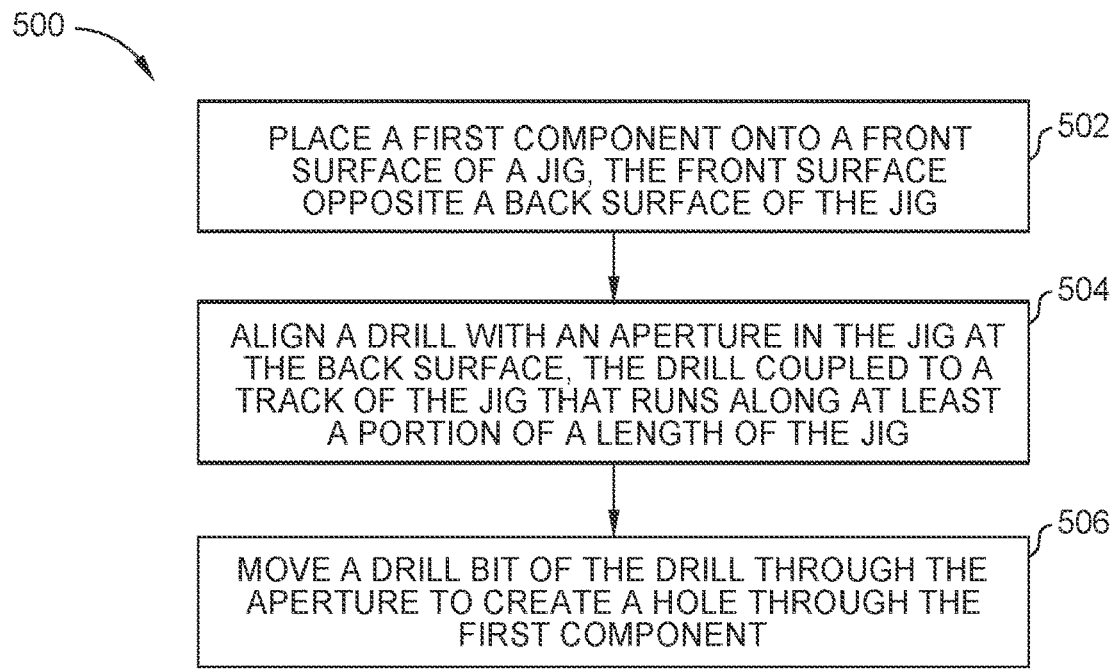
FIG. 5 is a flowchart of a method of manufacturing an assembly of components.

FIG. 5 is a flowchart of a method 500 of manufacturing an assembly of components. The components may include any of component 160, component 160A, component 160B, spar 110, front spar 110F, rear spar 110R, stiffeners 130, rib posts 140 described herein. At operation 502, a first component is placed onto a front surface (such as front surface 214/214') of a jig (such as jig 210/210'). The front surface is opposite a back surface (such as back surface 216/216'). In some aspects, the front surface of the jig defines a nominal shape (such as nominal shape 180) of the first component. In some aspects, operation 502 includes conforming the first component to the nominal shape within a predefined tolerance. In some aspects, operation 502 includes analyzing an interface between the first component and the front surface, and identifying a portion of the first component that is outside of the predefined tolerance.

In some aspects, conforming the first component to the nominal shape includes adjusting a fit of the first component against the front surface. In some aspects, conforming the first component to the nominal shape includes at least one of: applying a preload to at least a portion of the first component; removing material (such as portion 184) from a portion of the first component; or adding a shim (such as shim 182) between a portion of the first component and the front surface. In some aspects, adding a shim between a portion of the first component and the front surface includes adhering the shim to the first component. In some aspects, adding a shim between a portion of the first component and the front surface includes applying the shim in liquid form, and allowing the liquid to set.

In some aspects, operation 502 includes aligning the first component to a desired orientation with respect to the front surface. In an example, the first component is aligned with an indexing feature (e.g. indexing feature 240/340), such as described herein. For instance, one or more indexing features (such as one or more of the indexing features 170) of the first component is aligned to a position adjacent one or more corresponding features (e.g. 240, 340).

In some aspects, operation 502 includes securing the first component to the jig after conforming the first component to the nominal shape within the predefined tolerance. In some aspects, the securing may be by applying one or more tooling pins (such as tooling pins 292), such as described herein.

In some examples, the first component at least partially overlays a second component. In some examples, a second component at least partially overlays the first component. In some aspects, in either of the above examples, operation 502 includes aligning the first and second components to a desired juxtaposition with respect to each other. In an example, at least one of the first or second components is aligned with an indexing feature (e.g. one or more of the indexing features 170) of the other of the first or second components, such as described herein. For instance, one or more indexing features (such as one or more of the indexing features 170) of at least one of the first or second components is aligned to a position adjacent one or more corresponding features (e.g. one or more of the indexing features 170) of the other of the first or second components.

In some aspects, operation 502 includes placing the first and second components into a nominal configuration with respect to each other. In an example, placing the first and second components in a nominal configuration with respect to each other includes conforming the first and second components to each other. In some aspects, conforming the first and second components to each other includes at least one of: applying a preload to at least a portion of the first component; applying a preload to at least a portion of the second component; removing material (such as portion 184A) from a portion of the first component; removing material (such as portion 184B) from a portion of the second component; or adding a shim 182 between a portion of the first component and a portion of the second component.

In some aspects, adding a shim between a portion of the first component and a portion of the second component includes adhering the shim to the first component. In some aspects, adding a shim between a portion of the first component and a portion of the second component includes adhering the shim to the second component. In some aspects, adding a shim between a portion of the first component and a portion of the second component includes applying the shim in liquid form, and allowing the liquid to set. In some aspects, operation 502 includes placing the first and second components into a nominal configuration with respect to each other by conforming the first and second components to each other within a predefined tolerance.

In some aspects, operation 502 includes securing the first and second components to each other. In some aspects, the securing of the first and second components to each other may be by applying one or more tooling pins (such as tooling pins 292), such as described herein.

At operation 504, a drill, such as drill 270, is aligned with an aperture (such as aperture 230/330) of the jig at the back surface. The drill is coupled to a track (such as track 252/252'/254) that runs along at least a portion of a length of the jig.

In some aspects, aligning the drill with the aperture includes moving a carriage (such as carriage 260) to which the drill is mounted, such as described above. In some aspects, operation 504 includes verifying that the drill is aligned with the aperture, such as described above. In some aspects, operation 504 includes verifying that a drill bit of the drill is aligned normal to the component surface that is facing the drill. In some aspects, operation 504 includes verifying that the drill bit of the drill is aligned normal to the front surface of the jig. In some aspects, operation 504 includes verifying that the drill bit of the drill is aligned normal to the back surface of the jig. In some aspects, operation 504 includes adjusting the orientation of the drill bit.

At operation 506, a drill bit (such as drill bit 272A) of the drill is moved through the aperture to create a hole through the first component. In some aspects, the hole is drilled as described herein. In some aspects, the hole is a pilot hole, such as described above. In some aspects, the hole is drilled to a size corresponding to a size of a fastener, such as fastener 150. In an example, the fastener is sized for an interference fit in the hole. In some aspects, operation 506 includes creating the hole from the back side of the jig. In some aspects, operation 506 includes moving the drill bit of the drill through the aperture before contacting and penetrating the first component.

In some aspects, the drill bit creates a hole through a second component. In some aspects, the hole through the second component is aligned with the hole through the first component. In some aspects, the holes through the first and second components are created in a single drilling operation. In some aspects, the hole is drilled through an interface (such as interface 165) of the first and second components.

In some aspects, method 500 includes inspecting the hole. In some aspects, inspecting the hole includes using a tool (such as at least one of the tools 272) mounted to a carriage (such as carriage 260). In some aspects, the tool is a sensor (e.g. sensor 272E). In some aspects, the sensor is a camera. In some aspects, the sensor is a measurement tool, such as a laser measurer. In some aspects, inspecting the hole includes using the tool to scan, image, probe, or otherwise investigate the size, geometry, orientation, or surface finish of the hole.

In some aspects, any one or more of the operations of method 400 may be incorporated into method 500. In some aspects, any one or more of the operations of method 500 may be incorporated into method 400.

Figure 6:
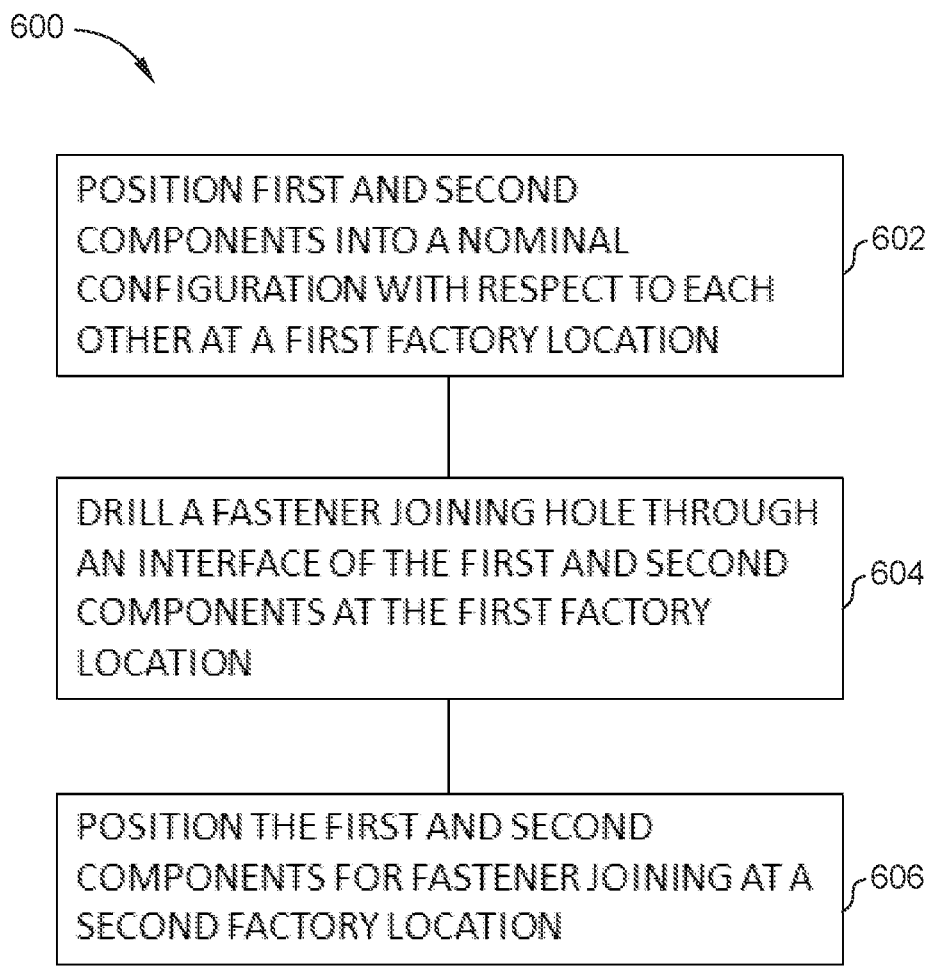
FIG. 6 is a flowchart of a method of manufacturing an assembly of components.

FIG. 6 is a flowchart of a method 600 of manufacturing an assembly of components. The components may include any of component 160, component 160A, component 160B, spar 110, front spar 110F, rear spar 110R, stiffeners 130, rib posts 140 described herein. At operation 602, first and second components are positioned into a nominal configuration with respect to each other at a first factory location. In some aspects, operation 602 includes conforming the first and second components to each other. In some aspects, conforming the first and second components to each other includes at least one of: applying a preload to at least a portion of the first component; applying a preload to at least a portion of the second component; removing material (such as portion 184A) from a portion of the first component; removing material (such as portion 184B) from a portion of the second component; or adding a shim 182 between a portion of the first component and a portion of the second component.

In some aspects, adding a shim between a portion of the first component and a portion of the second component includes adhering the shim to the first component. In some aspects, adding a shim between a portion of the first component and a portion of the second component includes adhering the shim to the second component. In some aspects, adding a shim between a portion of the first component and a portion of the second component includes applying the shim in liquid form, and allowing the liquid to set. In some aspects, operation 602 includes placing the first and second components into a nominal configuration with respect to each other by conforming the first and second components to each other within a predefined tolerance.

In some aspects, operation 602 includes securing the first and second components to each other. In some aspects, the securing of the first and second components to each other may be by applying one or more tooling pins (such as tooling pins 292), such as described herein.

At operation 604, a fastener joining hole (such as hole 152, 152A, 152B) is drilled through an interface (such as interface 165) of the first and second components at the first factory location. In some aspects, the fastener joining hole is drilled as described herein. In some aspects, the drilling of the fastener joining hole includes drilling a pilot hole, and then opening out the pilot hole to a size corresponding to a size of a fastener, such as fastener 150. In some aspects, the fastener joining hole is drilled to a size corresponding to a size of a fastener in a single drilling operation. In an example sizing, the fastener is sized for an interference fit in the hole.

In some aspects, method 600 includes inspecting the fastener joining hole while the first and second components are at the first factory location. In some aspects, inspecting the fastener joining hole includes using a tool (such as at least one of the tools 272) mounted to a carriage (such as carriage 260). In some aspects, the tool is a sensor (e.g. sensor 272E). In some aspects, the sensor is a camera. In some aspects, the sensor is a measurement tool, such as a laser measurer. In some aspects, inspecting the fastener joining hole includes using the tool to scan, image, probe, or otherwise investigate the size, geometry, orientation, or surface finish of the fastener joining hole. In some aspects, the method 600 includes separating the first and second components after drilling the fastener joining hole.

At operation 606, the first and second components are positioned for fastener joining at a second factory location. The second factory location is different from the first factory location. In some aspects, the second factory location is in a different building to a building housing the first factory location. In some aspects, the second factory location is in a different portion of the building in which the first factory location is housed. In some aspects, the first and second components are transported from the first factory location to the second factory location between operation 604 and operation 606. In an example, the first and second components are transported together from the first factory location to the second factory location between operation 604 and operation 606. In another example, the first and second components are transported separately from the first factory location to the second factory location between operation 604 and operation 606.

In some aspects, operation 606 includes placing the first and second components into a nominal configuration with respect to each other. In an example, placing the first and second components in a nominal configuration with respect to each other includes conforming the first and second components to each other. In some aspects, conforming the first and second components to each other includes at least one of: applying a preload to at least a portion of the first component; applying a preload to at least a portion of the second component; removing material (such as portion 184A) from a portion of the first component; removing material (such as portion 184B) from a portion of the second component; or adding a shim 182 between a portion of the first component and a portion of the second component.

In some aspects, adding a shim between a portion of the first component and a portion of the second component includes adhering the shim to the first component. In some aspects, adding a shim between a portion of the first component and a portion of the second component includes adhering the shim to the second component. In some aspects, adding a shim between a portion of the first component and a portion of the second component includes applying the shim in liquid form, and allowing the liquid to set. In some aspects, operation 606 includes placing the first and second components into a nominal configuration with respect to each other by conforming the first and second components to each other within a predefined tolerance.

In some aspects, operation 606 includes securing the first and second components to each other. In some aspects, the securing of the first and second components to each other may be by applying one or more tooling pins (such as tooling pins 292), such as described herein.

In some aspects, method 600 includes performing a pre-assembly operation on at least one of the first or second components between operation 604 and operation 606. In some aspects, the pre-assembly operation includes at least one of cleaning up drilling debris, deburring, applying a primer, anodizing, or applying a seal, such as a fay seal.

In some aspects, method 600 includes inspecting the fastener joining hole while the first and second components are at the second factory location. In some aspects, inspecting the fastener joining hole includes using a tool (such as at least one of the tools 272) mounted to a carriage (such as carriage 260). In some aspects, the tool is a sensor (e.g. sensor 272E). In some aspects, the sensor is a camera. In some aspects, the sensor is a measurement tool, such as a laser measurer. In some aspects, inspecting the fastener joining hole includes using the tool to scan, image, probe, or otherwise investigate the size, geometry, orientation, or surface finish of the fastener joining hole. In some aspects, the method 600 includes separating the first and second components after drilling the fastener joining hole.

In some aspects, method 600 includes inserting a fastener, such as fastener 150, into the fastener joining hole to couple the first and second components together. In some aspects, inserting the fastener is performed at the second factory location. In some aspects, the fastener is an interference fit in the fastener joining hole. In some aspects, the fastener is not an interference fit in the fastener joining hole.

In some aspects, any one or more of the operations of method 400 may be incorporated into method 600. In some aspects, any one or more of the operations of method 500 may be incorporated into method 600. In some aspects, any one or more of the operations of method 600 may be incorporated into method 400. In some aspects, any one or more of the operations of method 600 may be incorporated into method 500.

Figure 7:
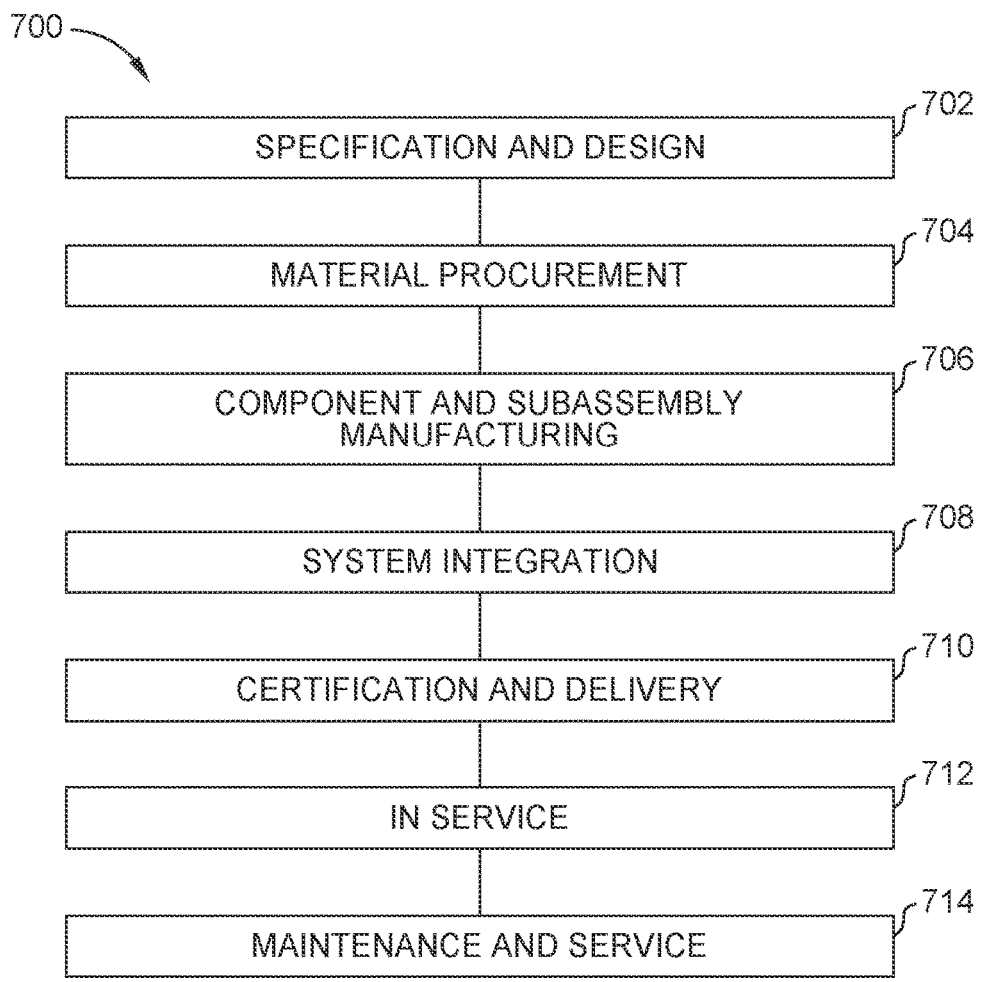
FIG. 7 is a flowchart of an aircraft manufacturing and service method.
Figure 8:
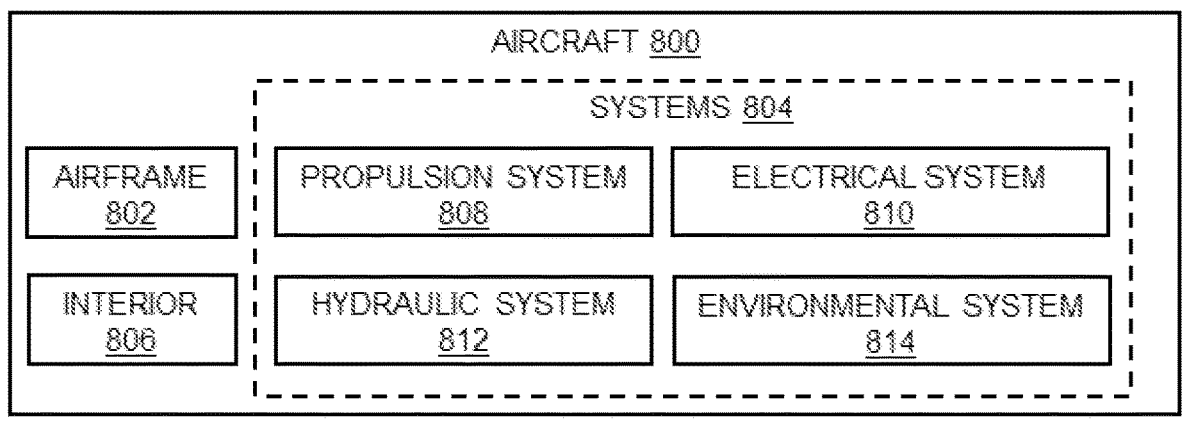
FIG. 8 is a block diagram representation of an aircraft for which any of the aspects of the present disclosure may be implemented.

Illustrative embodiments of the present disclosure may be described in the context of aircraft manufacturing and service method 700 as shown in FIG. 7 and aircraft 800 as shown in FIG. 8. Turning first to FIG. 7, an illustration of an aircraft manufacturing and service method in a form of a block diagram is depicted in accordance with an illustrative aspect. During pre-production, aircraft manufacturing and service method 700 may include specification and design 702 of the aircraft 800 of FIG. 8 and material procurement 704.

During production, component and subassembly manufacturing 706 and system integration 708 of aircraft 800 takes place. Thereafter, aircraft 800 may go through certification and delivery 710 in order to be placed in service 712. While in service 712 by a customer, aircraft 800 is scheduled for routine maintenance and service 714, which may include modification, reconfiguration, refurbishment, or other maintenance and service.

Each of the processes of aircraft manufacturing and service method 700 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 8, an illustration of an aircraft in a form of a block diagram is depicted in which an illustrative aspect may be implemented. In this example, aircraft 800 is produced by aircraft manufacturing and service method 700 of FIG. 7 and may include airframe 802 with plurality of systems 804 and interior 806. Examples of systems 804 include one or more of propulsion system 808, electrical system 810, hydraulic system 812, and environmental system 814. Any number of other systems may be included.

Apparatuses and methods embodied herein may be employed during at least one of the stages of aircraft manufacturing and service method 700. One or more illustrative aspects may be manufactured or used during at least one of component and subassembly manufacturing 706, system integration 708, in service 712, or maintenance and service 714 of FIG. 7.

Systems, apparatus, and methods of the present disclosure present several advantages over conventional systems, apparatus, and methods. For example, the fit between components that are to be coupled together can be adjusted and verified before the components are brought together at a final assembly location. Additionally, a component can be adjusted and verified to conform to a nominal size and shape within a predefined tolerance before components are brought together at a final assembly location. Such aspects enable the realization of time savings over the performance of test fitting, drilling, and assembly at a single location.

Also, drilling the holes in a drilling location to a size corresponding to a size of a fastener, and then assembling the components in a different final assembly location facilitates a cleaner environment at the final assembly location because there is little or no drilling debris at the final assembly location. Moreover, use of the system at the drilling location mitigates the likelihood of misalignment of holes in corresponding components at final assembly.

Additionally, the systems, apparatus, and methods of the present disclosure facilitate the drilling of the holes to a size corresponding to a size of a fastener before performing pre-assembly treatments (such as cleaning up drilling debris, deburring, applying a primer, anodizing, or applying a fay seal) while mitigating such risks as seal contamination or poor metal treatment that can occur when drilling and final assembly operations are performed together at one location.

Furthermore, by separating the drilling function from the assembly function (such as the insertion of fasteners), the robotic machinery employed for such functions can be less complex; lighter in weight; and cheaper to build, operate, and maintain; than the current robotic machinery that performs the drilling and the assembly functions combined. For example, current robotic machinery that performs a combination of the drilling and the assembly functions uses a five-axis CNC drill to drill the holes through the components. Such a drill is large, complex, heavy, and expensive to buy and maintain when compared to a simpler drill that may be used as part of the jig apparatus described herein.

In the present disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium (s) having computer readable program code embodied thereon.

Program code embodied on a computer readable storage medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is contemplated that elements and features of any one aspect may be beneficially incorporated in other aspects. While the foregoing is directed to aspects of the present disclosure, other and further aspects of the disclosure may be devised without departing from the basic scope thereof, and the scope thereof is determined by the claims that follow.

What is claimed is:

1. A method of manufacturing an assembly of components, comprising:
   positioning first and second components into a nominal configuration with respect to each other at a first factory location, the positioning including placing the first component onto a front surface of a jig, the front surface opposite a back surface of the jig;
   aligning a drill with an aperture in the jig at the back surface, the drill coupled to a track of the jig that runs along at least a portion of a length of the jig;
   drilling a fastener joining hole through an interface of the first and second components at the first factory location by moving a drill bit of the drill through the aperture to create the fastener joining hole through the first component and the second component:
   separating the first and second components after drilling the fastener joining hole; and
   positioning the first and second components for fastener joining at a second factory location.

2. The method of claim 1, wherein:
   the front surface defines a nominal shape of the first component; and
   the method further comprises:
      conforming the first component to the nominal shape within a predefined tolerance; and
      securing the first component to the front surface.

3. The method of claim 2, wherein conforming the first component to the nominal shape comprises:

analyzing an interface between the first component and the front surface; and identifying a portion of the first component that is outside of the predefined tolerance.

4. The method of claim 3, further comprising adjusting a fit of the first component against the front surface by performing at least one of:

applying a preload to at least a portion of the first component;

removing material from a section of the first component; or adding a shim between a section of the first component and the front surface.

5. The method of claim 1, wherein aligning the drill with the aperture in the jig comprises moving the drill along the track.

6. The method of claim 1, further comprising aligning the first component with the second component to a desired juxtaposition on the jig.

7. The method of claim 6, wherein positioning the first and second components into the nominal configuration with respect to each other includes conforming the first and second components to each other within a predefined tolerance.

8. The method of claim 7, wherein drilling the fastener joining hole is performed after conforming the first and second components to each other.

9. The method of claim 6, wherein the fastener joining hole is drilled to a size corresponding to a size of a fastener.

10. A method of manufacturing an assembly of components, comprising:

positioning first and second components into a nominal configuration with respect to each other at a first factory location;

drilling a fastener joining hole through an interface of the first and second components at the first factory location;

separating the first and second components after drilling the fastener joining hole; and positioning the first and second components for fastener joining at a second factory location.

11. The method of claim 10, wherein positioning the first and second components into the nominal configuration with respect to each other includes conforming the first and second components to each other within a predefined tolerance.

12. The method of claim 11, wherein drilling the fastener joining hole is performed after conforming the first and second components to each other within the predefined tolerance.

13. The method of claim 10, further comprising performing a pre-assembly operation on at least one of the first or second components between drilling the fastener joining hole and positioning the first and second components at the second factory location, the pre-assembly operation including at least one of cleaning up drilling debris, deburring, applying a primer, anodizing, or applying a seal.

14. The method of claim 10, wherein positioning the first and second components for fastener joining comprises placing the first and second components into the nominal configuration with respect to each other by conforming the first and second components to each other within a predefined tolerance.

15. The method of claim 10, further comprising inserting a fastener into the fastener joining hole to couple the first and second components together.

* * * * *